(12) United States Patent
Rao et al.

(10) Patent No.: US 8,559,449 B2
(45) Date of Patent: Oct. 15, 2013

(54) SYSTEMS AND METHODS FOR PROVIDING A VPN SOLUTION

(75) Inventors: Goutham P. Rao, San Jose, CA (US); Robert Rodriguez, San Jose, CA (US); Eric Brueggemann, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 182 days.

(21) Appl. No.: 13/149,383

(22) Filed: May 31, 2011

(65) Prior Publication Data

US 2011/0231929 A1   Sep. 22, 2011

Related U.S. Application Data

(63) Continuation of application No. 12/336,795, filed on Dec. 17, 2008, now Pat. No. 7,978,716, which is a continuation of application No. 10/988,004, filed on Nov. 12, 2004, now Pat. No. 7,496,097.

(60) Provisional application No. 60/518,305, filed on Nov. 11, 2003, provisional application No. 60/524,999, filed on Nov. 24, 2003.

(51) Int. Cl.
  *H04L 12/28* (2006.01)

(52) U.S. Cl.
  USPC ........... 370/401; 370/352; 370/392; 709/238; 709/203

(58) Field of Classification Search
  None
  See application file for complete search history.

(56) References Cited

U.S. PATENT DOCUMENTS 4,479,195 A   10/1984   Herr et al.
4,701,844 A   10/1987   Thompson et al.
(Continued)

FOREIGN PATENT DOCUMENTS

CN   1394042   1/2003
CN   1410905   4/2003
(Continued)

OTHER PUBLICATIONS

Advisory Action for U.S. Appl. No. 11/039,946 dated Mar. 24, 2009.
(Continued)

*Primary Examiner* — Duc C Ho
(74) *Attorney, Agent, or Firm* — Foley and Lardner LLP; Christopher J. McKenna

(57) ABSTRACT

A system, apparatus and a method for implementing a secured communications link at a layer other than that at which packets are filtered are disclosed. In one embodiment, a computer system is configured to form a virtual private network ("VPN") and comprises an address inspection driver to identify initial target packet traffic addressed to a target server. Also, the computer system includes a pseudo server module to receive rerouted initial target packet traffic from the address inspection driver. The pseudo server module is configured to convey packet regeneration instructions to a VPN gateway. The address inspection driver functions to identify additional target packet traffic addressed to the target server and routes the additional target packet traffic to the pseudo server. In one embodiment, the pseudo server is configured to strip header information from the additional target packet traffic to form a payload, and thereafter, to route the payload to the target.

20 Claims, 6 Drawing Sheets

(56) References Cited

U.S. PATENT DOCUMENTS

| | | |
|---|---|---|
| 4,885,680 A | 12/1989 | Anthony et al. |
| 4,935,870 A | 6/1990 | Burk et al. |
| 5,301,270 A | 4/1994 | Steinberg et al. |
| 5,307,413 A | 4/1994 | Denzer |
| 5,329,619 A | 7/1994 | Page et al. |
| 5,359,712 A | 10/1994 | Cohen et al. |
| 5,511,208 A | 4/1996 | Boyles et al. |
| 5,519,699 A | 5/1996 | Ohsawa |
| 5,521,940 A | 5/1996 | Lane et al. |
| 5,561,769 A | 10/1996 | Kumar et al. |
| 5,623,492 A | 4/1997 | Teraslinna |
| 5,625,793 A | 4/1997 | Mirza |
| 5,657,390 A | 8/1997 | Elgamal et al. |
| 5,671,226 A | 9/1997 | Murakami et al. |
| 5,708,656 A | 1/1998 | Noneman et al. |
| 5,742,829 A | 4/1998 | Davis et al. |
| 5,758,085 A | 5/1998 | Kouoheris et al. |
| 5,758,110 A | 5/1998 | Boss et al. |
| 5,761,431 A | 6/1998 | Gross et al. |
| 5,787,470 A | 7/1998 | DeSimone et al. |
| 5,812,668 A | 9/1998 | Weber |
| 5,815,462 A | 9/1998 | Konishi et al. |
| 5,819,020 A | 10/1998 | Beeler, Jr. |
| 5,822,524 A | 10/1998 | Chen et al. |
| 5,828,840 A | 10/1998 | Cowan et al. |
| 5,835,726 A | 11/1998 | Shwed et al. |
| 5,838,920 A | 11/1998 | Rosborough |
| 5,850,446 A | 12/1998 | Berger et al. |
| 5,852,717 A | 12/1998 | Bhide et al. |
| 5,864,837 A | 1/1999 | Maimone |
| 5,881,229 A | 3/1999 | Singh et al. |
| 5,889,863 A | 3/1999 | Weber |
| 5,893,150 A | 4/1999 | Hagersten et al. |
| 5,911,051 A | 6/1999 | Carson et al. |
| 5,918,244 A | 6/1999 | Percival |
| 5,925,100 A | 7/1999 | Drewry et al. |
| 5,931,917 A | 8/1999 | Nguyen et al. |
| 5,931,961 A | 8/1999 | Ranganathan et al. |
| 5,933,605 A | 8/1999 | Kawano et al. |
| 5,940,074 A | 8/1999 | Britt et al. |
| 5,943,424 A | 8/1999 | Berger et al. |
| 5,956,483 A | 9/1999 | Grate et al. |
| 5,958,016 A | 9/1999 | Chang et al. |
| 5,978,840 A | 11/1999 | Nguyen et al. |
| 5,983,208 A | 11/1999 | Haller et al. |
| 5,987,132 A | 11/1999 | Rowney |
| 5,987,482 A | 11/1999 | Bates et al. |
| 5,987,611 A | 11/1999 | Freund |
| 5,995,999 A | 11/1999 | Bharadhwaj |
| 5,996,076 A | 11/1999 | Rowney et al. |
| 5,999,179 A | 12/1999 | Kekic et al. |
| 5,999,525 A | 12/1999 | Krishnaswamy et al. |
| 6,002,767 A | 12/1999 | Kramer |
| 6,021,470 A | 2/2000 | Frank et al. |
| 6,023,724 A | 2/2000 | Bhatia et al. |
| 6,026,379 A | 2/2000 | Haller et al. |
| 6,026,413 A | 2/2000 | Challenger et al. |
| 6,026,440 A | 2/2000 | Shrader et al. |
| 6,029,175 A | 2/2000 | Chow et al. |
| 6,058,250 A | 5/2000 | Harwood et al. |
| 6,061,715 A | 5/2000 | Hawes |
| 6,061,769 A | 5/2000 | Kapulka et al. |
| 6,061,796 A | 5/2000 | Chen et al. |
| 6,067,569 A | 5/2000 | Khaki et al. |
| 6,072,870 A | 6/2000 | Nguyen et al. |
| 6,092,155 A | 7/2000 | Olnowich |
| 6,101,543 A | 8/2000 | Alden et al. |
| 6,112,085 A | 8/2000 | Garner et al. |
| 6,119,105 A | 9/2000 | Williams |
| 6,119,151 A | 9/2000 | Cantrell et al. |
| 6,122,403 A | 9/2000 | Rhoads |
| 6,128,627 A | 10/2000 | Mattis et al. |
| 6,131,120 A | 10/2000 | Reid |
| 6,141,686 A | 10/2000 | Jackowski et al. |
| 6,144,775 A | 11/2000 | Williams et al. |
| 6,157,955 A | 12/2000 | Narad et al. |
| 6,161,123 A | 12/2000 | Renouard et al. |
| 6,163,772 A | 12/2000 | Kramer et al. |
| 6,170,017 B1 | 1/2001 | Dias et al. |
| 6,173,325 B1 | 1/2001 | Kukreja |
| 6,175,869 B1 | 1/2001 | Ahuja et al. |
| 6,178,409 B1 | 1/2001 | Weber et al. |
| 6,182,139 B1 | 1/2001 | Brendel |
| 6,192,408 B1 | 2/2001 | Vahalia et al. |
| 6,219,669 B1 | 4/2001 | Haff et al. |
| 6,233,249 B1 | 5/2001 | Katseff et al. |
| 6,233,606 B1 | 5/2001 | Dujari |
| 6,233,619 B1 | 5/2001 | Narisi et al. |
| 6,236,652 B1 | 5/2001 | Preston et al. |
| 6,252,851 B1 | 6/2001 | Siu et al. |
| 6,253,027 B1 | 6/2001 | Weber et al. |
| 6,253,188 B1 | 6/2001 | Witek et al. |
| 6,253,327 B1 | 6/2001 | Zhang et al. |
| 6,256,773 B1 | 7/2001 | Bowman-Amuah |
| 6,272,146 B1 | 8/2001 | Bowater et al. |
| 6,272,148 B1 | 8/2001 | Takagi et al. |
| 6,272,556 B1 | 8/2001 | Gish |
| 6,282,172 B1 | 8/2001 | Robles et al. |
| 6,289,382 B1 | 9/2001 | Bowman-Amuah |
| 6,289,450 B1 | 9/2001 | Pensak et al. |
| 6,301,249 B1 | 10/2001 | Mansfield et al. |
| 6,304,915 B1 | 10/2001 | Nguyen et al. |
| 6,308,273 B1 | 10/2001 | Goertzel et al. |
| 6,321,235 B1 | 11/2001 | Bird |
| 6,321,337 B1 | 11/2001 | Reshef et al. |
| 6,324,525 B1 | 11/2001 | Kramer et al. |
| 6,324,582 B1 | 11/2001 | Sridhar et al. |
| 6,324,647 B1 | 11/2001 | Bowman-Amuah |
| 6,324,648 B1 | 11/2001 | Grantges, Jr. |
| 6,327,242 B1 | 12/2001 | Amicangioli et al. |
| 6,332,163 B1 | 12/2001 | Bowman-Amuah |
| 6,333,931 B1 | 12/2001 | LaPier et al. |
| 6,334,664 B1 | 1/2002 | Silverbrook |
| 6,339,832 B1 | 1/2002 | Bowman-Amuah |
| 6,345,239 B1 | 2/2002 | Bowman-Amuah |
| 6,363,363 B1 | 3/2002 | Haller et al. |
| 6,363,478 B1 | 3/2002 | Lambert et al. |
| 6,370,573 B1 | 4/2002 | Bowman-Amuah |
| 6,370,599 B1 | 4/2002 | Anand et al. |
| 6,373,950 B1 | 4/2002 | Rowney |
| 6,383,478 B1 | 5/2002 | Prokop et al. |
| 6,389,462 B1 | 5/2002 | Cohen et al. |
| 6,389,505 B1 | 5/2002 | Emma et al. |
| 6,398,359 B1 | 6/2002 | Silverbrook et al. |
| 6,405,364 B1 | 6/2002 | Bowman-Amuah |
| 6,412,000 B1 | 6/2002 | Riddle et al. |
| 6,415,329 B1 | 7/2002 | Gelman et al. |
| 6,427,132 B1 | 7/2002 | Bowman-Amuah |
| 6,431,777 B1 | 8/2002 | Silverbrook |
| 6,434,568 B1 | 8/2002 | Bowman-Amuah |
| 6,434,618 B1 | 8/2002 | Cohen et al. |
| 6,434,628 B1 | 8/2002 | Bowman-Amuah |
| 6,438,127 B1 | 8/2002 | Le Goff et al. |
| 6,438,594 B1 | 8/2002 | Bowman-Amuah |
| 6,442,571 B1 | 8/2002 | Haff et al. |
| 6,442,682 B1 | 8/2002 | Pothapragada et al. |
| 6,442,748 B1 | 8/2002 | Bowman-Amuah |
| 6,447,113 B1 | 9/2002 | Silverbrook et al. |
| 6,449,658 B1 | 9/2002 | Lafe et al. |
| 6,449,695 B1 | 9/2002 | Bereznyi et al. |
| 6,452,915 B1 | 9/2002 | Jorgensen |
| 6,452,923 B1 | 9/2002 | Gerszberg et al. |
| 6,457,103 B1 | 9/2002 | Challenger et al. |
| 6,473,794 B1 | 10/2002 | Guheen et al. |
| 6,473,802 B2 | 10/2002 | Masters |
| 6,477,580 B1 | 11/2002 | Bowman-Amuah |
| 6,477,665 B1 | 11/2002 | Bowman-Amuah |
| 6,484,143 B1 | 11/2002 | Swildens et al. |
| 6,484,206 B2 | 11/2002 | Crump et al. |
| 6,487,641 B1 | 11/2002 | Cusson et al. |
| 6,496,481 B1 | 12/2002 | Wu et al. |
| 6,496,776 B1 | 12/2002 | Blumberg et al. |
| 6,496,850 B1 | 12/2002 | Bowman-Amuah |
| 6,496,935 B1 | 12/2002 | Fink et al. |

(56) References Cited

U.S. PATENT DOCUMENTS

| | | |
|---|---|---|
| 6,502,102 B1 | 12/2002 | Haswell et al. |
| 6,502,192 B1 | 12/2002 | Nguyen |
| 6,502,213 B1 | 12/2002 | Bowman-Amuah |
| 6,507,891 B1 | 1/2003 | Challenger et al. |
| 6,519,571 B1 | 2/2003 | Guheen et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,012 B1 | 4/2003 | Villa et al. |
| 6,550,057 B1 | 4/2003 | Bowman-Amuah |
| 6,553,129 B1 | 4/2003 | Rhoads |
| 6,553,377 B1 | 4/2003 | Eschelbeck et al. |
| 6,553,409 B1 | 4/2003 | Zhang et al. |
| 6,571,282 B1 | 5/2003 | Bowman-Amuah |
| 6,574,668 B1 | 6/2003 | Gubbi et al. |
| 6,574,688 B1 | 6/2003 | Dale et al. |
| 6,578,068 B1 | 6/2003 | Bowman-Amuah |
| 6,578,073 B1 | 6/2003 | Starnes et al. |
| 6,584,569 B2 | 6/2003 | Reshef et al. |
| 6,590,588 B2 | 7/2003 | Lincke et al. |
| 6,591,266 B1 | 7/2003 | Li et al. |
| 6,594,690 B2 | 7/2003 | Cantwell |
| 6,598,075 B1 | 7/2003 | Ogdon et al. |
| 6,601,057 B1 | 7/2003 | Underwood et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,663 B1 | 8/2003 | Liao et al. |
| 6,606,744 B1 | 8/2003 | Mikurak |
| 6,609,128 B1 | 8/2003 | Underwood |
| 6,611,262 B1 | 8/2003 | Suzuki |
| 6,611,522 B1 | 8/2003 | Zheng et al. |
| 6,611,822 B1 | 8/2003 | Beams et al. |
| 6,611,867 B1 | 8/2003 | Bowman-Amuah |
| 6,614,800 B1 | 9/2003 | Genty et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,618,359 B1 | 9/2003 | Chen et al. |
| 6,629,081 B1 | 9/2003 | Cornelius et al. |
| 6,631,986 B2 | 10/2003 | Silverbrook |
| 6,633,574 B1 | 10/2003 | Koch et al. |
| 6,633,878 B1 | 10/2003 | Underwood |
| 6,636,242 B2 | 10/2003 | Bowman-Amuah |
| 6,640,238 B1 | 10/2003 | Bowman-Amuah |
| 6,640,240 B1 | 10/2003 | Hoffman et al. |
| 6,640,244 B1 | 10/2003 | Bowman-Amuah |
| 6,640,248 B1 | 10/2003 | Jorgensen |
| 6,640,249 B1 | 10/2003 | Bowman-Amuah |
| 6,647,130 B2 | 11/2003 | Rhoads |
| 6,650,640 B1 | 11/2003 | Muller et al. |
| 6,652,089 B2 | 11/2003 | Silverbrook |
| 6,652,090 B2 | 11/2003 | Silverbrook |
| 6,662,221 B1 | 12/2003 | Gonda et al. |
| 6,662,357 B1 | 12/2003 | Bowman-Amuah |
| 6,664,978 B1 | 12/2003 | Kekic et al. |
| 6,671,818 B1 | 12/2003 | Mikurak |
| 6,678,734 B1 | 1/2004 | Haatainen et al. |
| 6,681,029 B1 | 1/2004 | Rhoads |
| 6,687,732 B1 | 2/2004 | Bector et al. |
| 6,691,227 B1 | 2/2004 | Neves et al. |
| 6,697,824 B1 | 2/2004 | Bowman-Amuah |
| 6,697,844 B1 | 2/2004 | Chan et al. |
| 6,697,849 B1 | 2/2004 | Carlson |
| 6,700,902 B1 | 3/2004 | Meyer |
| 6,701,345 B1 | 3/2004 | Carley et al. |
| 6,701,514 B1 | 3/2004 | Haswell et al. |
| 6,704,873 B1 | 3/2004 | Underwood |
| 6,715,145 B1 | 3/2004 | Bowman-Amuah |
| 6,718,535 B1 | 4/2004 | Underwood |
| 6,721,713 B1 | 4/2004 | Guheen et al. |
| 6,728,787 B1 | 4/2004 | Leigh |
| 6,732,269 B1 | 5/2004 | Baskey et al. |
| 6,732,314 B1 | 5/2004 | Borella et al. |
| 6,735,601 B1 | 5/2004 | Subrahmanyam |
| 6,735,691 B1 | 5/2004 | Capps et al. |
| 6,742,015 B1 | 5/2004 | Bowman-Amuah |
| 6,744,774 B2 | 6/2004 | Sharma |
| 6,754,699 B2 | 6/2004 | Swildens et al. |
| 6,760,748 B1 | 7/2004 | Hakim |
| 6,766,373 B1 | 7/2004 | Beadle et al. |
| 6,775,392 B1 | 8/2004 | Rhoads |
| 6,785,719 B1 | 8/2004 | Jacobson et al. |
| 6,788,315 B1 | 9/2004 | Kekic et al. |
| 6,789,170 B1 | 9/2004 | Jacobs et al. |
| 6,792,615 B1 | 9/2004 | Rowe et al. |
| 6,801,927 B1 | 10/2004 | Smith et al. |
| 6,802,020 B1 | 10/2004 | Smith |
| 6,807,607 B1 | 10/2004 | Lamparter |
| 6,820,125 B1 | 11/2004 | Dias et al. |
| 6,820,133 B1 | 11/2004 | Grove et al. |
| 6,820,974 B2 | 11/2004 | Silverbrook |
| 6,823,374 B2 | 11/2004 | Kausik et al. |
| 6,826,626 B1 | 11/2004 | McManus |
| 6,826,627 B2 | 11/2004 | Sjollema et al. |
| 6,831,898 B1 | 12/2004 | Edsall et al. |
| 6,842,906 B1 | 1/2005 | Bowman-Amuah |
| 6,847,892 B2 | 1/2005 | Zhou et al. |
| 6,850,252 B1 | 2/2005 | Hoffberg |
| 6,870,921 B1 | 3/2005 | Elsey et al. |
| 6,873,988 B2 | 3/2005 | Herrmann et al. |
| 6,880,086 B2 | 4/2005 | Kidder et al. |
| 6,883,068 B2 | 4/2005 | Tsirigotis et al. |
| 6,888,927 B1 | 5/2005 | Cruickshank et al. |
| 6,894,981 B1 | 5/2005 | Coile et al. |
| 6,899,420 B2 | 5/2005 | Silverbrook |
| 6,901,072 B1 | 5/2005 | Wong |
| 6,904,449 B1 | 6/2005 | Quinones |
| 6,904,519 B2 | 6/2005 | Anand et al. |
| 6,907,546 B1 | 6/2005 | Haswell et al. |
| 6,910,074 B1 | 6/2005 | Amin et al. |
| 6,912,522 B2 | 6/2005 | Edgar |
| 6,918,113 B2 | 7/2005 | Patel et al. |
| 6,918,665 B2 | 7/2005 | Silverbrook |
| 6,920,502 B2 | 7/2005 | Araujo et al. |
| 6,925,495 B2 | 8/2005 | Hegde et al. |
| 6,934,288 B2 | 8/2005 | Dempo |
| 6,935,736 B2 | 8/2005 | Silverbrook |
| 6,944,279 B2 | 9/2005 | Elsey et al. |
| 6,954,736 B2 | 10/2005 | Menninger et al. |
| 6,954,877 B2 | 10/2005 | Earl et al. |
| 6,957,186 B1 | 10/2005 | Guheen et al. |
| 6,957,249 B2 | 10/2005 | Salo et al. |
| 6,959,320 B2 | 10/2005 | Shah et al. |
| 6,974,928 B2 | 12/2005 | Bloom |
| 6,976,090 B2 | 12/2005 | Ben-Shaul et al. |
| 6,980,962 B1 | 12/2005 | Arganbright et al. |
| 6,990,070 B1 | 1/2006 | Aweya et al. |
| 6,990,480 B1 | 1/2006 | Burt |
| 6,993,016 B1 | 1/2006 | Liva et al. |
| 6,996,628 B2 | 2/2006 | Keane et al. |
| 6,996,631 B1 | 2/2006 | Aiken et al. |
| 7,000,012 B2 | 2/2006 | Moore et al. |
| 7,007,092 B2 | 2/2006 | Peiffer |
| 7,007,103 B2 | 2/2006 | Pinkerton et al. |
| 7,010,300 B1 | 3/2006 | Jones et al. |
| 7,013,290 B2 | 3/2006 | Ananian |
| 7,016,055 B2 | 3/2006 | Dodge et al. |
| 7,020,719 B1 | 3/2006 | Grove et al. |
| 7,023,979 B1 | 4/2006 | Wu et al. |
| 7,024,452 B1 | 4/2006 | O'Connell et al. |
| 7,026,954 B2 | 4/2006 | Slemmer et al. |
| 7,027,055 B2 | 4/2006 | Anderson et al. |
| 7,028,083 B2 | 4/2006 | Levine et al. |
| 7,028,333 B2 | 4/2006 | Tuomenoksa et al. |
| 7,028,334 B2 | 4/2006 | Tuomenoksa |
| 7,031,314 B2 | 4/2006 | Craig et al. |
| 7,034,691 B1 | 4/2006 | Rapaport et al. |
| 7,035,427 B2 | 4/2006 | Rhoads |
| 7,036,142 B1 | 4/2006 | Zhang et al. |

(56) References Cited

U.S. PATENT DOCUMENTS

| | | |
|---|---|---|
| 7,039,606 B2 | 5/2006 | Hoffman et al. |
| 7,039,708 B1 | 5/2006 | Knobl et al. |
| 7,042,879 B2 | 5/2006 | Eschbach et al. |
| 7,043,529 B1 | 5/2006 | Simonoff |
| 7,047,279 B1 | 5/2006 | Beams et al. |
| 7,047,424 B2 | 5/2006 | Bendinelli et al. |
| 7,051,161 B2 | 5/2006 | Dixit et al. |
| 7,051,316 B2 | 5/2006 | Charisius et al. |
| 7,054,837 B2 | 5/2006 | Hoffman et al. |
| 7,054,944 B2 | 5/2006 | Tang et al. |
| 7,055,028 B2 | 5/2006 | Peiffer et al. |
| 7,055,169 B2 | 5/2006 | Delpuch et al. |
| 7,055,947 B2 | 6/2006 | Silverbrook |
| 7,057,759 B2 | 6/2006 | Lapstun et al. |
| 7,069,234 B1 | 6/2006 | Cornelius et al. |
| 7,070,110 B2 | 7/2006 | Lapstun et al. |
| 7,072,665 B1 | 7/2006 | Blumberg et al. |
| 7,072,843 B2 | 7/2006 | Menninger et al. |
| 7,072,965 B2 | 7/2006 | Ryuutou et al. |
| 7,080,041 B2 | 7/2006 | Nagel |
| 7,082,409 B1 | 7/2006 | Cherry |
| 7,085,683 B2 | 8/2006 | Anderson et al. |
| 7,085,834 B2 | 8/2006 | Delany et al. |
| 7,085,854 B2 | 8/2006 | Keane et al. |
| 7,086,728 B2 | 8/2006 | Silverbrook |
| 7,092,370 B2 | 8/2006 | Jiang et al. |
| 7,096,009 B2 | 8/2006 | Mousseau et al. |
| 7,096,418 B1 | 8/2006 | Singhal et al. |
| 7,096,495 B1 | 8/2006 | Warrier et al. |
| 7,097,106 B2 | 8/2006 | Silverbrook et al. |
| 7,100,195 B1 | 8/2006 | Underwood |
| 7,103,068 B1 | 9/2006 | Gardner et al. |
| 7,107,285 B2 | 9/2006 | Von Kaenel et al. |
| 7,113,779 B1 | 9/2006 | Fujisaki |
| 7,113,962 B1 | 9/2006 | Kee et al. |
| 7,114,180 B1 | 9/2006 | DeCaprio |
| 7,117,504 B2 | 10/2006 | Smith et al. |
| 7,117,530 B1 | 10/2006 | Lin |
| 7,120,596 B2 | 10/2006 | Hoffman et al. |
| 7,120,666 B2 | 10/2006 | McCanne et al. |
| 7,120,690 B1 | 10/2006 | Krishnan et al. |
| 7,120,852 B2 | 10/2006 | Terry et al. |
| 7,124,101 B1 | 10/2006 | Mikurak |
| 7,124,442 B2 | 10/2006 | Nash-Putnam |
| 7,126,955 B2 | 10/2006 | Nabhan et al. |
| 7,128,265 B2 | 10/2006 | Silverbrook et al. |
| 7,128,270 B2 | 10/2006 | Silverbrook et al. |
| 7,130,792 B2 | 10/2006 | Tokieda et al. |
| 7,130,807 B1 | 10/2006 | Mikurak |
| 7,131,596 B2 | 11/2006 | Lapstun et al. |
| 7,134,131 B1 | 11/2006 | Hendricks et al. |
| 7,135,991 B2 | 11/2006 | Slemmer et al. |
| 7,136,645 B2 | 11/2006 | Hanson et al. |
| 7,137,566 B2 | 11/2006 | Silverbrook et al. |
| 7,139,999 B2 | 11/2006 | Bowman-Amuah |
| 7,140,044 B2 | 11/2006 | Redlich et al. |
| 7,143,153 B1 | 11/2006 | Black et al. |
| 7,144,095 B2 | 12/2006 | Silverbrook |
| 7,146,384 B2 | 12/2006 | Sawafta |
| 7,146,644 B2 | 12/2006 | Redlich et al. |
| 7,149,698 B2 | 12/2006 | Guheen et al. |
| 7,149,897 B2 | 12/2006 | Chincheck et al. |
| 7,149,959 B1 | 12/2006 | Jones et al. |
| 7,150,398 B2 | 12/2006 | Silverbrook et al. |
| 7,152,047 B1 | 12/2006 | Nagel |
| 7,152,092 B2 | 12/2006 | Beams et al. |
| 7,152,207 B1 | 12/2006 | Underwood et al. |
| 7,155,518 B2 | 12/2006 | Forslow |
| 7,155,676 B2 | 12/2006 | Land et al. |
| 7,159,014 B2 | 1/2007 | Kausik et al. |
| 7,159,777 B2 | 1/2007 | Silverbrook et al. |
| 7,164,680 B2 | 1/2007 | Loguinov |
| 7,165,041 B1 | 1/2007 | Guheen et al. |
| 7,167,844 B1 | 1/2007 | Leong et al. |
| 7,171,379 B2 | 1/2007 | Menninger et al. |
| 7,175,089 B2 | 2/2007 | Silverbrook et al. |
| 7,178,106 B2 | 2/2007 | Lamkin et al. |
| 7,178,719 B2 | 2/2007 | Silverbrook et al. |
| 7,181,766 B2 | 2/2007 | Bendinelli et al. |
| 7,184,445 B2 | 2/2007 | Gupta et al. |
| 7,187,470 B2 | 3/2007 | Lapstun et al. |
| 7,188,273 B2 | 3/2007 | Allen et al. |
| 7,188,769 B2 | 3/2007 | Silverbrook et al. |
| 7,191,252 B2 | 3/2007 | Redlich et al. |
| 7,194,761 B1 | 3/2007 | Champagne |
| 7,197,374 B2 | 3/2007 | Silverbrook et al. |
| 7,197,502 B2 | 3/2007 | Feinsmith |
| 7,197,570 B2 | 3/2007 | Eylon et al. |
| 7,197,751 B2 | 3/2007 | Fedotov et al. |
| 7,199,885 B2 | 4/2007 | Dodge |
| 7,200,804 B1 | 4/2007 | Khavari et al. |
| 7,206,811 B2 | 4/2007 | Skurikhin et al. |
| 7,207,483 B2 | 4/2007 | Silverbrook et al. |
| 7,207,485 B2 | 4/2007 | Silverbrook et al. |
| 7,212,296 B2 | 5/2007 | Dodge et al. |
| 7,216,173 B2 | 5/2007 | Clayton et al. |
| 7,219,127 B2 | 5/2007 | Huck et al. |
| 7,221,660 B1 | 5/2007 | Simonson et al. |
| 7,222,152 B1 | 5/2007 | Thompson et al. |
| 7,222,305 B2 | 5/2007 | Teplov et al. |
| 7,225,040 B2 | 5/2007 | Eller et al. |
| 7,225,244 B2 | 5/2007 | Reynolds et al. |
| 7,225,382 B2 | 5/2007 | Ramech et al. |
| 7,228,459 B2 | 6/2007 | Jiang et al. |
| 7,246,233 B2 | 7/2007 | Brabson et al. |
| 7,260,617 B2 | 8/2007 | Bazinet et al. |
| 7,260,840 B2 | 8/2007 | Swander et al. |
| 7,263,071 B2 | 8/2007 | Yim |
| 7,272,853 B2 | 9/2007 | Goodman et al. |
| 7,284,044 B2 | 10/2007 | Teraoaka et al. |
| 7,318,100 B2 | 1/2008 | Demmer et al. |
| 7,321,906 B2 | 1/2008 | Green |
| 7,328,267 B1 | 2/2008 | Bashyam et al. |
| 7,340,772 B2 | 3/2008 | Panasyuk et al. |
| 7,353,533 B2 | 4/2008 | Wright et al. |
| 7,363,347 B2 | 4/2008 | Thomas |
| 7,363,378 B2 | 4/2008 | Holmes et al. |
| 7,370,353 B2 | 5/2008 | Yang |
| 7,386,631 B1 | 6/2008 | Sibal et al. |
| 7,389,462 B1 | 6/2008 | Wang et al. |
| 7,392,348 B2 | 6/2008 | Dumont |
| 7,398,320 B1 | 7/2008 | Minakuchi et al. |
| 7,398,552 B2 | 7/2008 | Pardee et al. |
| 7,401,116 B1 | 7/2008 | Chalfin et al. |
| 7,404,003 B1 | 7/2008 | Noble |
| 7,406,533 B2 | 7/2008 | Li et al. |
| 7,409,708 B2 | 8/2008 | Goodman et al. |
| 7,415,723 B2 | 8/2008 | Pandya |
| 7,420,992 B1 | 9/2008 | Fang et al. |
| 7,433,314 B2 | 10/2008 | Sharma et al. |
| 7,441,119 B2 | 10/2008 | Brabson et al. |
| 7,458,095 B2 | 11/2008 | Forsberg |
| 7,464,264 B2 | 12/2008 | Goodman et al. |
| 7,480,312 B2 | 1/2009 | Ossman |
| 7,496,659 B1 | 2/2009 | Coverdill et al. |
| 7,505,455 B1 | 3/2009 | Goodwin et al. |
| 7,512,702 B1 | 3/2009 | Srivastava et al. |
| 7,522,581 B2 | 4/2009 | Acharya et al. |
| 7,533,409 B2 | 5/2009 | Keane et al. |
| 7,536,715 B2 | 5/2009 | Markham |
| 7,577,144 B2 | 8/2009 | Chang et al. |
| 7,606,902 B2 | 10/2009 | Rao et al. |
| 7,609,721 B2 | 10/2009 | Rao et al. |
| 7,644,188 B2 | 1/2010 | Vlodavsky et al. |
| 7,673,048 B1 | 3/2010 | O'Toole et al. |
| 7,757,074 B2 | 7/2010 | Sundarrajan et al. |
| 7,882,247 B2 | 2/2011 | Sturniolo et al. |
| 7,945,678 B1 | 5/2011 | Skene |
| 7,979,528 B2 | 7/2011 | Eisenberg et al. |
| 7,979,694 B2 | 7/2011 | Touitou et al. |
| 8,005,981 B2 | 8/2011 | Tuck et al. |
| 8,205,000 B2 * | 6/2012 | Chang et al. .......... 709/230 |
| 8,223,647 B2 | 7/2012 | Kakani et al. |
| 2001/0030970 A1 | 10/2001 | Wiryaman et al. |

(56) References Cited

U.S. PATENT DOCUMENTS

| | | |
|---|---|---|
| 2001/0037387 A1 | 11/2001 | Gilde et al. |
| 2001/0043600 A1 | 11/2001 | Chatterjee et al. |
| 2001/0046212 A1 | 11/2001 | Nakajima |
| 2001/0047406 A1 | 11/2001 | Araujo et al. |
| 2001/0049741 A1 | 12/2001 | Skene et al. |
| 2001/0052016 A1 | 12/2001 | Skene et al. |
| 2002/0004834 A1 | 1/2002 | Guenther et al. |
| 2002/0004902 A1 | 1/2002 | Toh et al. |
| 2002/0007402 A1 | 1/2002 | Thomas Huston et al. |
| 2002/0007404 A1 | 1/2002 | Vange et al. |
| 2002/0016827 A1 | 2/2002 | McCabe et al. |
| 2002/0023210 A1 | 2/2002 | Tuomenoksa et al. |
| 2002/0026478 A1 | 2/2002 | Rodgers et al. |
| 2002/0026531 A1 | 2/2002 | Keane et al. |
| 2002/0029285 A1 | 3/2002 | Collins |
| 2002/0032725 A1 | 3/2002 | Araujo et al. |
| 2002/0032798 A1 | 3/2002 | Xu |
| 2002/0035451 A1 | 3/2002 | Rothermel |
| 2002/0035596 A1 | 3/2002 | Yang et al. |
| 2002/0038339 A1 | 3/2002 | Xu |
| 2002/0042875 A1 | 4/2002 | Shukla |
| 2002/0049608 A1 | 4/2002 | Hartsell et al. |
| 2002/0049841 A1 | 4/2002 | Johnson et al. |
| 2002/0055966 A1 | 5/2002 | Border et al. |
| 2002/0057717 A1 | 5/2002 | Mallory |
| 2002/0059274 A1 | 5/2002 | Hartsell et al. |
| 2002/0059429 A1 | 5/2002 | Carpenter et al. |
| 2002/0059435 A1 | 5/2002 | Border et al. |
| 2002/0065864 A1 | 5/2002 | Hartsell et al. |
| 2002/0065919 A1 | 5/2002 | Taylor et al. |
| 2002/0069278 A1 | 6/2002 | Forslow |
| 2002/0071438 A1 | 6/2002 | Singh |
| 2002/0073061 A1 | 6/2002 | Collins |
| 2002/0073298 A1 | 6/2002 | Geiger et al. |
| 2002/0081971 A1 | 6/2002 | Travostino |
| 2002/0083175 A1 | 6/2002 | Afek et al. |
| 2002/0083183 A1 | 6/2002 | Pujare et al. |
| 2002/0087729 A1 | 7/2002 | Edgar |
| 2002/0091788 A1 | 7/2002 | Chlan et al. |
| 2002/0095400 A1 | 7/2002 | Johnson et al. |
| 2002/0095498 A1 | 7/2002 | Chanda et al. |
| 2002/0098840 A1 | 7/2002 | Hanson et al. |
| 2002/0099940 A1 | 7/2002 | Wang |
| 2002/0101848 A1 | 8/2002 | Lee et al. |
| 2002/0101860 A1 | 8/2002 | Thornton et al. |
| 2002/0105972 A1 | 8/2002 | Richter et al. |
| 2002/0107903 A1 | 8/2002 | Richter et al. |
| 2002/0107962 A1 | 8/2002 | Richter et al. |
| 2002/0107971 A1 | 8/2002 | Bailey et al. |
| 2002/0107989 A1 | 8/2002 | Johnson et al. |
| 2002/0107990 A1 | 8/2002 | Johnson et al. |
| 2002/0108059 A1 | 8/2002 | Canion et al. |
| 2002/0116452 A1 | 8/2002 | Johnson et al. |
| 2002/0116582 A1 | 8/2002 | Copeland et al. |
| 2002/0120743 A1 | 8/2002 | Shabtay et al. |
| 2002/0126675 A1 | 9/2002 | Yoshimura et al. |
| 2002/0133593 A1 | 9/2002 | Johnson et al. |
| 2002/0138511 A1 | 9/2002 | Psounis et al. |
| 2002/0138572 A1 | 9/2002 | Delany et al. |
| 2002/0138618 A1 | 9/2002 | Szabo |
| 2002/0138640 A1 | 9/2002 | Raz et al. |
| 2002/0147795 A1 | 10/2002 | Cantwell |
| 2002/0147822 A1 | 10/2002 | Susai et al. |
| 2002/0150064 A1 | 10/2002 | Lucidarme |
| 2002/0152373 A1 | 10/2002 | Sun et al. |
| 2002/0152423 A1 | 10/2002 | McCabe |
| 2002/0156927 A1 | 10/2002 | Boucher et al. |
| 2002/0161908 A1 | 10/2002 | Benitez et al. |
| 2002/0163882 A1 | 11/2002 | Bornstein et al. |
| 2002/0174227 A1 | 11/2002 | Hartsell et al. |
| 2002/0174255 A1 | 11/2002 | Hayter et al. |
| 2002/0176532 A1 | 11/2002 | McClelland et al. |
| 2002/0184224 A1 | 12/2002 | Haff et al. |
| 2002/0194382 A1 | 12/2002 | Kausik et al. |
| 2002/0196279 A1 | 12/2002 | Bloomfield et al. |
| 2002/0199007 A1 | 12/2002 | Clayton et al. |
| 2003/0009538 A1 | 1/2003 | Shah et al. |
| 2003/0014623 A1 | 1/2003 | Freed et al. |
| 2003/0014624 A1 | 1/2003 | Maturana et al. |
| 2003/0014625 A1 | 1/2003 | Freed et al. |
| 2003/0014628 A1 | 1/2003 | Freed et al. |
| 2003/0014650 A1 | 1/2003 | Freed et al. |
| 2003/0018891 A1 | 1/2003 | Hall et al. |
| 2003/0023767 A1 | 1/2003 | Brabson et al. |
| 2003/0026241 A1 | 2/2003 | Ono et al. |
| 2003/0033520 A1 | 2/2003 | Peiffer et al. |
| 2003/0037108 A1 | 2/2003 | Peiffer et al. |
| 2003/0039354 A1 | 2/2003 | Kimble et al. |
| 2003/0046586 A1 | 3/2003 | Bheemarasetti et al. |
| 2003/0046587 A1 | 3/2003 | Bheemarasetti et al. |
| 2003/0051100 A1 | 3/2003 | Patel |
| 2003/0051102 A1 | 3/2003 | Jacobs et al. |
| 2003/0055883 A1 | 3/2003 | Wiles, Jr. |
| 2003/0055962 A1 | 3/2003 | Freund et al. |
| 2003/0061505 A1 | 3/2003 | Sperry et al. |
| 2003/0065763 A1 | 4/2003 | Swildens et al. |
| 2003/0067874 A1 | 4/2003 | See et al. |
| 2003/0069941 A1 | 4/2003 | Peiffer |
| 2003/0079031 A1 | 4/2003 | Nagano |
| 2003/0084162 A1 | 5/2003 | Johnson et al. |
| 2003/0084165 A1 | 5/2003 | Kjellberg et al. |
| 2003/0088698 A1 | 5/2003 | Singh et al. |
| 2003/0088788 A1 | 5/2003 | Yang |
| 2003/0093566 A1 | 5/2003 | Jardin |
| 2003/0105604 A1 | 6/2003 | Ash et al. |
| 2003/0105977 A1 | 6/2003 | Brabson et al. |
| 2003/0110296 A1 | 6/2003 | Kirsch et al. |
| 2003/0110379 A1 | 6/2003 | Ylonen et al. |
| 2003/0112809 A1 | 6/2003 | Bharali et al. |
| 2003/0112823 A1 | 6/2003 | Collins et al. |
| 2003/0115421 A1 | 6/2003 | McHenry et al. |
| 2003/0123394 A1 | 7/2003 | Neale et al. |
| 2003/0123481 A1 | 7/2003 | Neale et al. |
| 2003/0131079 A1 | 7/2003 | Neale et al. |
| 2003/0131263 A1 | 7/2003 | Keane et al. |
| 2003/0140121 A1 | 7/2003 | Adams |
| 2003/0149899 A1 | 8/2003 | Boden et al. |
| 2003/0152028 A1 | 8/2003 | Raisanen et al. |
| 2003/0154110 A1 | 8/2003 | Walter et al. |
| 2003/0154239 A1 | 8/2003 | Davis et al. |
| 2003/0165138 A1 | 9/2003 | Swonk et al. |
| 2003/0167403 A1 | 9/2003 | McCurley et al. |
| 2003/0174718 A1 | 9/2003 | Sampath et al. |
| 2003/0177389 A1 | 9/2003 | Albert et al. |
| 2003/0177395 A1 | 9/2003 | Pardee et al. |
| 2003/0182423 A1 | 9/2003 | Shafir et al. |
| 2003/0182431 A1 | 9/2003 | Sturniolo et al. |
| 2003/0182437 A1 | 9/2003 | Kobayashi et al. |
| 2003/0188001 A1 | 10/2003 | Eisenberg et al. |
| 2003/0191799 A1 | 10/2003 | Araujo et al. |
| 2003/0191812 A1 | 10/2003 | Agarwalla et al. |
| 2003/0198189 A1 | 10/2003 | Roberts et al. |
| 2003/0200295 A1 | 10/2003 | Roberts et al. |
| 2003/0200353 A1 | 10/2003 | Dogra et al. |
| 2003/0208602 A1 | 11/2003 | Bhalla et al. |
| 2003/0212760 A1 | 11/2003 | Chen et al. |
| 2003/0212776 A1 | 11/2003 | Roberts et al. |
| 2003/0217105 A1 | 11/2003 | Zircher et al. |
| 2003/0217126 A1 | 11/2003 | Polcha et al. |
| 2003/0217149 A1 | 11/2003 | Crichton et al. |
| 2003/0223361 A1 | 12/2003 | Hussain et al. |
| 2003/0223418 A1 | 12/2003 | Desai et al. |
| 2003/0223433 A1 | 12/2003 | Lee et al. |
| 2003/0226018 A1 | 12/2003 | Tardo et al. |
| 2003/0229718 A1 | 12/2003 | Tock et al. |
| 2003/0229761 A1 | 12/2003 | Basu et al. |
| 2003/0233423 A1 | 12/2003 | Dilley et al. |
| 2003/0236831 A1 | 12/2003 | Ortiz et al. |
| 2003/0236837 A1 | 12/2003 | Johnson et al. |
| 2003/0236861 A1 | 12/2003 | Johnson et al. |
| 2003/0236919 A1 | 12/2003 | Johnson et al. |
| 2004/0003101 A1 | 1/2004 | Roth et al. |
| 2004/0003137 A1 | 1/2004 | Callender et al. |
| 2004/0006708 A1 | 1/2004 | Mukherjee et al. |

(56) References Cited

U.S. PATENT DOCUMENTS

| | | |
|---|---|---|
| 2004/0008693 A1 | 1/2004 | Grove et al. |
| 2004/0010601 A1 | 1/2004 | Afergan et al. |
| 2004/0010604 A1 | 1/2004 | Tanaka et al. |
| 2004/0010621 A1 | 1/2004 | Afergan et al. |
| 2004/0031058 A1 | 2/2004 | Reisman |
| 2004/0034744 A1 | 2/2004 | Karlsson et al. |
| 2004/0034794 A1 | 2/2004 | Mayer et al. |
| 2004/0039827 A1 | 2/2004 | Thomas et al. |
| 2004/0042487 A1 | 3/2004 | Ossman |
| 2004/0044521 A1 | 3/2004 | Chen et al. |
| 2004/0044731 A1 | 3/2004 | Chen et al. |
| 2004/0049515 A1 | 3/2004 | Haff et al. |
| 2004/0073716 A1 | 4/2004 | Boom et al. |
| 2004/0078621 A1 | 4/2004 | Talaugon et al. |
| 2004/0078772 A1 | 4/2004 | Balay et al. |
| 2004/0087304 A1 | 5/2004 | Buddhikot et al. |
| 2004/0098486 A1 | 5/2004 | Gu et al. |
| 2004/0100976 A1 | 5/2004 | Chang et al. |
| 2004/0103150 A1 | 5/2004 | Ogdon et al. |
| 2004/0103225 A1 | 5/2004 | McAlpine et al. |
| 2004/0103438 A1 | 5/2004 | Yan et al. |
| 2004/0107360 A1 | 6/2004 | Herrmann et al. |
| 2004/0111519 A1 | 6/2004 | Fu et al. |
| 2004/0128252 A1 | 7/2004 | Shirai et al. |
| 2004/0141525 A1 | 7/2004 | Bhushan et al. |
| 2004/0143655 A1 | 7/2004 | Narad et al. |
| 2004/0143734 A1 | 7/2004 | Buer et al. |
| 2004/0146053 A1 | 7/2004 | Nabhan et al. |
| 2004/0162876 A1 | 8/2004 | Kohavi |
| 2004/0177158 A1 | 9/2004 | Bauch et al. |
| 2004/0177359 A1 | 9/2004 | Bauch et al. |
| 2004/0190092 A1 | 9/2004 | Silverbrook et al. |
| 2004/0202171 A1 | 10/2004 | Hama |
| 2004/0203296 A1 | 10/2004 | Moreton et al. |
| 2004/0205439 A1 | 10/2004 | Carmeli et al. |
| 2004/0210320 A1 | 10/2004 | Pandya |
| 2004/0213248 A1 | 10/2004 | Okuda et al. |
| 2004/0215665 A1 | 10/2004 | Edgar et al. |
| 2004/0215746 A1 | 10/2004 | McCanne et al. |
| 2004/0221031 A1 | 11/2004 | Desai |
| 2004/0225898 A1 | 11/2004 | Frost et al. |
| 2004/0225911 A1 | 11/2004 | Smith |
| 2004/0249975 A1 | 12/2004 | Tuck et al. |
| 2004/0258003 A1 | 12/2004 | Kokot et al. |
| 2004/0260922 A1 | 12/2004 | Goodman et al. |
| 2004/0268175 A1 | 12/2004 | Koch et al. |
| 2004/0268357 A1 | 12/2004 | Joy et al. |
| 2004/0268358 A1 | 12/2004 | Darling et al. |
| 2005/0005014 A1 | 1/2005 | Holmes et al. |
| 2005/0005107 A1 | 1/2005 | Touboul |
| 2005/0013280 A1 | 1/2005 | Buddhikot et al. |
| 2005/0021762 A1 | 1/2005 | Gbadegesin |
| 2005/0022011 A1 | 1/2005 | Swander et al. |
| 2005/0022012 A1 | 1/2005 | Bluestone et al. |
| 2005/0022031 A1 | 1/2005 | Goodman et al. |
| 2005/0025150 A1 | 2/2005 | Helmy et al. |
| 2005/0027788 A1 | 2/2005 | Koopmans et al. |
| 2005/0031058 A1 | 2/2005 | Soong et al. |
| 2005/0033858 A1 | 2/2005 | Swildens et al. |
| 2005/0033926 A1 | 2/2005 | Dumont |
| 2005/0044350 A1 | 2/2005 | White et al. |
| 2005/0050317 A1 | 3/2005 | Kramer et al. |
| 2005/0055690 A1 | 3/2005 | Cornillon et al. |
| 2005/0058112 A1 | 3/2005 | Lahey et al. |
| 2005/0080850 A1 | 4/2005 | Salesky et al. |
| 2005/0080907 A1 | 4/2005 | Panasyuk et al. |
| 2005/0102529 A1 | 5/2005 | Buddhikot et al. |
| 2005/0108412 A1 | 5/2005 | Sjollema et al. |
| 2005/0108517 A1 | 5/2005 | Dillon et al. |
| 2005/0122980 A1 | 6/2005 | Anand et al. |
| 2005/0125663 A1 | 6/2005 | Funk |
| 2005/0132030 A1 | 6/2005 | Hopen et al. |
| 2005/0132060 A1 | 6/2005 | Mo et al. |
| 2005/0135250 A1 | 6/2005 | Singh et al. |
| 2005/0144186 A1 | 6/2005 | Hesselink et al. |
| 2005/0144481 A1 | 6/2005 | Hopen et al. |
| 2005/0147126 A1 | 7/2005 | Qiu et al. |
| 2005/0149481 A1 | 7/2005 | Hesselink et al. |
| 2005/0149726 A1 | 7/2005 | Joshi et al. |
| 2005/0165928 A1 | 7/2005 | Shu et al. |
| 2005/0177866 A1 | 8/2005 | Kirsch |
| 2005/0185647 A1 | 8/2005 | Rao et al. |
| 2005/0193075 A1 | 9/2005 | Haff et al. |
| 2005/0195780 A1 | 9/2005 | Haverinen et al. |
| 2005/0198380 A1 | 9/2005 | Panasyuk et al. |
| 2005/0198532 A1 | 9/2005 | Comlekoglu et al. |
| 2005/0210150 A1 | 9/2005 | Bahl |
| 2005/0223412 A1 | 10/2005 | Nadalin et al. |
| 2005/0232161 A1 | 10/2005 | Maufer et al. |
| 2005/0232298 A1 | 10/2005 | Beverly et al. |
| 2005/0246346 A1 | 11/2005 | Gerdes et al. |
| 2005/0246445 A1 | 11/2005 | Panasyuk et al. |
| 2005/0256923 A1 | 11/2005 | Adachi |
| 2005/0259634 A1 | 11/2005 | Ross |
| 2005/0262357 A1 | 11/2005 | Araujo et al. |
| 2005/0265315 A1 | 12/2005 | Edgar |
| 2005/0265353 A1 | 12/2005 | Sengupta et al. |
| 2005/0267974 A1 | 12/2005 | Panasyuk et al. |
| 2005/0286466 A1 | 12/2005 | Tagg et al. |
| 2006/0005240 A1 | 1/2006 | Sundarrajan et al. |
| 2006/0015570 A1 | 1/2006 | Khemani et al. |
| 2006/0018332 A1 | 1/2006 | Kakani et al. |
| 2006/0031547 A1 | 2/2006 | Tsui et al. |
| 2006/0034283 A1 | 2/2006 | Ko et al. |
| 2006/0041635 A1 | 2/2006 | Alexander et al. |
| 2006/0053164 A1 | 3/2006 | Ewing et al. |
| 2006/0053253 A1 | 3/2006 | Roth et al. |
| 2006/0059370 A1 | 3/2006 | Asnis et al. |
| 2006/0064500 A1 | 3/2006 | Roth et al. |
| 2006/0069719 A1 | 3/2006 | McCanne et al. |
| 2006/0089996 A1 | 4/2006 | Peiffer |
| 2006/0112185 A1 | 5/2006 | Van Bemmel |
| 2006/0123477 A1 | 6/2006 | Raghavan et al. |
| 2006/0129689 A1 | 6/2006 | Ho et al. |
| 2006/0133405 A1 | 6/2006 | Fee |
| 2006/0142878 A1 | 6/2006 | Banik et al. |
| 2006/0185010 A1 | 8/2006 | Sultan |
| 2006/0225130 A1 | 10/2006 | Chen et al. |
| 2006/0245414 A1 | 11/2006 | Susai et al. |
| 2006/0271652 A1 | 11/2006 | Stavrakos et al. |
| 2006/0274828 A1 | 12/2006 | Siemens et al. |
| 2007/0008883 A1 | 1/2007 | Kobayashi |
| 2007/0061067 A1 | 3/2007 | Zeinstra et al. |
| 2007/0067366 A1 | 3/2007 | Landis |
| 2007/0110046 A1 | 5/2007 | Farrell et al. |
| 2007/0130324 A1 | 6/2007 | Wang |
| 2007/0130334 A1 | 6/2007 | Carley |
| 2007/0156852 A1 | 7/2007 | Sundarrajan et al. |
| 2007/0169179 A1 | 7/2007 | Narad |
| 2007/0179955 A1 | 8/2007 | Croft et al. |
| 2007/0192827 A1 | 8/2007 | Maxted et al. |
| 2007/0206621 A1 | 9/2007 | Plamondon et al. |
| 2007/0233910 A1 | 10/2007 | Paley et al. |
| 2007/0245409 A1 | 10/2007 | Harris et al. |
| 2008/0034416 A1 | 2/2008 | Kumar et al. |
| 2008/0046616 A1 | 2/2008 | Verzunov et al. |
| 2008/0049786 A1 | 2/2008 | Ram et al. |
| 2008/0071915 A1 | 3/2008 | Gbadegesin |
| 2008/0225720 A1 | 9/2008 | Khemani et al. |
| 2008/0225748 A1 | 9/2008 | Khemani et al. |
| 2008/0225753 A1 | 9/2008 | Khemani et al. |
| 2008/0229381 A1 | 9/2008 | Sikka et al. |
| 2008/0320151 A1 | 12/2008 | McCanne et al. |
| 2009/0133015 A1 | 5/2009 | Nagashima |
| 2010/0241846 A1 | 9/2010 | Sundarrajan et al. |

FOREIGN PATENT DOCUMENTS

| | | |
|---|---|---|
| EP | 0 436 365 | 7/1991 |
| EP | 0 618 708 | 10/1994 |
| EP | 0 838 930 | 4/1998 |
| EP | 1 045 553 | 10/2000 |
| EP | 1 134 942 | 9/2001 |
| EP | 1 427 133 | 6/2004 |

(56) References Cited

FOREIGN PATENT DOCUMENTS

| | | |
|---|---|---|
| EP | 1 432 209 | 6/2004 |
| JP | 07-302237 | 11/1995 |
| JP | 08-006910 | 1/1996 |
| JP | 10-178450 | 6/1998 |
| JP | 2002-532784 | 2/2002 |
| JP | 2002-084289 | 3/2002 |
| JP | 2004-078783 | 3/2004 |
| WO | WO-99/04343 | 1/1999 |
| WO | WO-00/34885 | 6/2000 |
| WO | WO-01/47185 | 6/2001 |
| WO | WO-02/13037 | 2/2002 |
| WO | WO-02/23362 | 3/2002 |
| WO | WO-02/39301 | 5/2002 |
| WO | WO-02/069604 | 9/2002 |
| WO | WO-03/019876 | 3/2003 |
| WO | WO-03/026244 | 3/2003 |
| WO | WO-03/048936 | 6/2003 |
| WO | WO-03/083692 | 10/2003 |
| WO | WO-2004/088933 | 10/2004 |
| WO | WO-2004/114529 | 12/2004 |
| WO | WO-2005/013534 | 2/2005 |
| WO | WO-2005/024567 | 3/2005 |
| WO | WO-2005/048106 | 5/2005 |
| WO | WO-2005/088476 | 9/2005 |
| WO | WO-2006/005078 | 1/2006 |
| WO | WO-2006/012612 | 2/2006 |
| WO | WO-2006/020823 | 2/2006 |
| WO | WO-2006/074072 | 7/2006 |
| WO | WO-2006/075219 A2 | 7/2006 |
| WO | WO-2008/112691 | 9/2008 |
| WO | WO-2008/112698 | 9/2008 |

OTHER PUBLICATIONS

Advisory Action for U.S. Appl. No. 11/161,091 dated May 6, 2009.
Advisory Action for U.S. Appl. No. 11/161,092 dated Apr. 24, 2009.
Advisory Action for U.S. Appl. No. 11/161,093 dated Nov. 16, 2009.
Advisory Action for U.S. Appl. No. 11/161,093 dated Dec. 14, 2009.
Advisory Action for U.S. Appl. No. 11/161,656 dated Jul. 29, 2009.
Communication for EP App. No. 05785297.2 dated May 18, 2007.
Communication for EP App. No. 07007414.1 dated Jun. 5, 2008.
Doug Allen, Layer-7 Load Balancers Pack New Punch, CMP Media LLC Network Magazine, Sep. 2003.
Exam Report for AU App. No. 2005266945 dated Jul. 21, 2009.
Exam Report for AU App. No. 2005272779 dated Apr. 23, 2009.
Exam Report for AU App. No. 2005272779 dated May 14, 2009.
Exam Report for EP App. No. 05776653.7 dated Apr. 20, 2009.
Exam Report for EP App. No. 05785297.2 dated Jun. 19, 2009.
Exam Report for EP App. No. 070074141 dated Nov. 17, 2009.
International Search Report for PCT/US2004/037918 dated Apr. 27, 2008.
International Search Report for PCT/US2005/022884 dated Jul. 8, 2008.
International Search Report for PCT/US2005/026296 dated Jan. 31, 2006.
International Search Report for PCT/US2005/026300 dated Dec. 16, 2005.
International Search Report for PCT/US2005/028663 dated Nov. 16, 2005.
Ipswitch Inc., WSFTP User's Guide, Chapter 8: Security, Jun. 25, 2003.
Noriaki Kobayashi, "Internet VPN", N+1 Network Guide, vol. 3, No. 9, Oct. 1, 2003, pp. 44-49. (9 pages) (English Abstract).
Notice of Acceptance for AU App. No. 2005266943 dated May 28, 2010.
Notice of Acceptance for AU App. No. 2005272779 dated May 26, 2010.
Notice of Allowance for U.S. Appl. No. 11/039,946 dated Mar. 7, 2010.
Notice of Allowance for U.S. Appl. No. 11/161,092 dated Jun. 11, 2009.
Notice of Allowance for U.S. Appl. No. 11/161,656 dated Sep. 18, 2009.
Notice of Allowance for U.S. Appl. No. 11/188,279 dated Jun. 29, 2009.
Notice of Allowance for U.S. Appl. No. 11/187,512 dated Jun. 23, 2011.
Office Action for AU App. No. 2005266943 dated May 14, 2009.
Office Action for CN App. No. 200480040249.X dated Jun. 19, 2009.
Office Action for CN App. No. 200480040249.X dated Sep. 26, 2008.
Office Action for CN App. No. 20050034849X dated Aug. 3, 2010.
Office Action for CN App. No. 200580028535 dated Jan. 15, 2010.
Office Action for CN App. No. 200580034849.X dated Sep. 25, 2009.
Office Action for CN App. No. 200580034849X dated Apr. 7, 2010.
Office Action for CN App. No. 200580030928.3 dated Apr. 23, 2010.
Office Action for IN App. No. 1514KOLNP2006 dated Sep. 7, 2010.
Office Action for JP App. No. 2006-539930 dated Feb. 18, 2010.
Office Action for JP App. No. 2007-048002 dated Nov. 1, 2010.
Office Action for JP App. No. 2007-048003 dated Nov. 1, 2010.
Office Action for JP App. No. 2007-519353 dated Jul. 12, 2010.
Office Action for JP App. No. 2007-522841 dated Sep. 10, 2010.
Office Action for JP App. No. 2007-525810 dated Aug. 4, 2010.
Office Action for U.S. Appl. No. 11/039,946 dated Jun. 23, 2009.
Office Action for U.S. Appl. No. 11/187,512 dated Jun. 22, 2010.
Office Action for U.S. Appl. No. 12/557,497 dated Nov. 19, 2010.
Office Action for U.S. Appl. No. 10/683,881 dated Dec. 11, 2007.
Office Action for U.S. Appl. No. 11/039,946 dated Jan. 23, 2009.
Office Action for U.S. Appl. No. 11/161,090 dated May 28, 2009.
Office Action for U.S. Appl. No. 11/161,090 dated Jan. 6, 2010.
Office Action for U.S. Appl. No. 11/161,090 dated Feb. 4, 2009.
Office Action for U.S. Appl. No. 11/161,090 dated Jun. 10, 2010.
Office Action for U.S. Appl. No. 11/161,090 dated Aug. 15, 2008.
Office Action for U.S. Appl. No. 11/161,090 dated Oct. 15, 2009.
Office Action for U.S. Appl. No. 11/161,091 dated Aug. 5, 2008.
Office Action for U.S. Appl. No. 11/161,092 dated Aug. 20, 2008.
Office Action for U.S. Appl. No. 11/161,093 dated Jun. 19, 2009.
Office Action for U.S. Appl. No. 11/161,093 dated Sep. 2, 2009.
Office Action for U.S. Appl. No. 11/161,093 dated Oct. 1, 2010.
Office Action for U.S. Appl. No. 11/161,093 dated Feb. 22, 2010.
Office Action for U.S. Appl. No. 11/161,656 dated May 13, 2009.
Office Action for U.S. Appl. No. 11/161,656 dated Oct. 28, 2008.
Office action for U.S. Appl. No. 11/161,091 dated Feb. 24, 2010.
Office action for U.S. Appl. No. 11/161,091 dated Aug. 3, 2009.
Office Action for U.S. Appl. No. 11/161,092 dated Feb. 12, 2009.
Office Action for U.S. Appl. No. 11/161,093 dated Jan. 2, 2009.
Office Action for U.S. Appl. No. 11/187,562 dated Apr. 27, 2009.
Office Action for U.S. Appl. No. 11/187,562 dated Dec. 9, 2008.
Office Action for U.S. Appl. No. 11/187,562 dated Jun. 10, 2008.
Office Action for U.S. Appl. No. 11/187,512 dated Mar. 3, 2009.
Office Action for U.S. Appl. No. 11/187,512 dated Sep. 15, 2009.
Office Action for U.S. Appl. No. 11/188,274 dated Sep. 8, 2010.
Office Action for U.S. Appl. No. 11/188,279 dated Jun. 26, 2008.
Office Action for U.S. Appl. No. 11/188,279 dated Dec. 23, 2008.
Office Action for U.S. Appl. No. 11/188,274 dated Mar. 29, 2010.
Pedro Hernandez, Tacit Adds to Softricity's Spark, Nov. 18, 2005. Available online at: www.enterpriseitplanet.com/networking/news/article.php/3565401, p. 1-2.
Restriction Requirement for U.S. Appl. No. 11/161,093 dated Jul. 26, 2010.
Search Report for EP App. No. 07007414 dated Jul. 16, 2007.
Written Opinion of the International Searching Authority for PCT/US2004/037918 mailed on Apr. 27, 2005.
Written Opinion of the International Searching Authority for PCT/US2005/022884 mailed on Jul. 8, 2008.
Written Opinion of the International Searching Authority for PCT/US2005/026296 mailed on Jan. 31, 2006.
Written Opinion of the International Searching Authority for PCT/US2005/026300 mailed on Dec. 16, 2005.
Written Opinion of the International Searching Authority for PCT/US2005/028663 mailed on Nov. 16, 2005.
Advisory Action for U.S. Appl. No. 11/187,508 dated Nov. 23, 2010.
Advisory Action for U.S. Appl. No. 11/187,512 dated Mar. 16, 2011.
International Search Report for PCT/US2005/023914 dated May 7, 2007.

(56) References Cited

OTHER PUBLICATIONS

International Search Report for PCT/US2005/047433 dated May 3, 2007.
International Search Report for PCT/US2005/047435 dated Sep. 8, 2006.
International Search Report for PCT/US2005/26296 dated Jan. 31, 2006.
International Search Report for PCT/US2007/066433 dated Oct. 31, 2007.
J. C. Mogul, "The Case for Persistent-Connection HTTP," 8282 Computer Communication Review 25, Oct. 1995.
Kong, et al; "Pseudo-serving: a user-responsible paradigm for internet access"; Apr. 7-11, 1997; SO Computer Networks and ISDN Systems; vol. 29; pp. 1053-1064.
Krishnamurthy B.C. et al., "Key differences between HTTP/1.0 and HTTP/1.1," Computer Networks, Elsevier Science Publishers B.V., vol. 31, No. 11-16, pp. 1737-1751, May 1999.
Lazenka, M. "The Evolution of Software Distribution: Where Did We Come From and Where Are We Heading?", 2005, ACM, p. 179-183.
Ipswitch Inc., WSFTP User's Guide, Chapter 8: Security, Jun. 25, 2003, 8 pages.
Notice of Allowance for U.S. Appl. No. 10/988,004 dated Sep. 18, 2008.
Notice of Allowance for U.S. Appl. No. 11/161,090 dated Mar. 4, 2011.
Notice of Allowance for U.S. Appl. No. 11/188,279 dated Jun. 17, 2009.
Notice of Allowance for U.S. Appl. No. 11/323,196 dated Apr. 19, 2010.
Notice of Allowance for U.S. Appl. No. 12/336,795 dated Mar. 2, 2011.
Notice of Allowance for U.S. Appl. No. 12/557,497 dated May 6, 2011.
Notice of Allowance for U.S. Appl. No. 12/560,154 dated May 2, 2011.
Notice of Reasons for Rejection for JP App. No. 2007-549641 dated May 17, 2011.
Office Action for CA App. No. 2545496 dated Dec. 15, 2010.
Office Action for CN App. No. 200580048867.3 dated Mar. 11, 2011.
Office Action for CN App. No. 200580048867.3 dated Jan. 26, 2011.
Office Action for CN App. No. 200580048867.3 dated Sep. 26, 2010.
Office Action for CN appl. 200580028535 dated Jan. 15, 2010.
Office Action for IL App. No. 180402 dated Dec. 15, 2010.
Office Action for IL App. No. 180405 dated Jan. 2, 2011.
Office Action for IL App. No. 180891 dated Jan. 4, 2011.
Office Action for IL App. No. 180169 dated Jan. 2, 2011.
Office Action for JP App. No. 2007-48001 dated Apr. 29, 2010.
Office Action for JP App. No. 2007-522843 dated Dec. 1, 2010.
Office Action for KR App. No. 2006-7009144 dated Jan. 14, 2011.
Office Action for U.S. Appl. No. 11/161,093 dated Jun. 28, 2011.
Office Action for U.S. Appl. No. 10/988,004 dated Jan. 24, 2008.
Office Action for U.S. Appl. No. 11/161,091 dated Apr. 5, 2011.
Office Action for U.S. Appl. No. 11/161,091 dated Dec. 7, 2010.
Office Action for U.S. Appl. No. 11/161,093 dated Feb. 3, 2011.
Office action for U.S. Appl. No. 11/161,091 dated Feb. 18, 2009.
Office Action for U.S. Appl. No. 11/169,002 dated Jun. 22, 2007.
Office Action for U.S. Appl. No. 11/169,002 dated Mar. 17, 2008.
Office Action for U.S. Appl. No. 11/187,508 dated Sep. 15, 2010.
Office Action for U.S. Appl. No. 11/187,508 dated Jul. 6, 2011.
Office Action for U.S. Appl. No. 11/187,512 dated Nov. 30, 2010.
Office Action for U.S. Appl. No. 11/187,512 dated Dec. 23, 2009.
Office Action for U.S. Appl. No. 11/187,508 dated Nov. 3, 2009.
Office Action for U.S. Appl. No. 11/187,508 dated Apr. 30, 2010.
Office Action for U.S. Appl. No. 11/188,274 dated Jun. 27, 2011.
Office Action for U.S. Appl. No. 11/323,196 dated Feb. 13, 2009.
Office Action for U.S. Appl. No. 11/323,196 dated Aug. 3, 2009.
Office Action for U.S. Appl. No. 11/323,196 dated Nov. 19, 2009.
Office Action for U.S. Appl. No. 11/323,196 dated Sep. 25, 2008.
Office Action for U.S. Appl. No. 11/323,196 dated Nov. 21, 2007.
Office Action for U.S. Appl. No. 11/323,196 dated May 14, 2008.
Office Action for U.S. Appl. No. 11/323,352 dated Mar. 9, 2009.
Office Action for U.S. Appl. No. 11/323,353 dated Jun. 3, 2009.
Office Action for U.S. Appl. No. 11/323,353 dated Jun. 25, 2010.
Office Action for U.S. Appl. No. 11/323,353 dated Dec. 10, 2009.
Office Action for U.S. Appl. No. 11/323,353 dated Dec. 30, 2008.
Office Action for U.S. Appl. No. 11/323,354 dated Feb. 4, 2009.
Office Action for U.S. Appl. No. 11/323,354 dated Aug. 4, 2009.
Office Action for U.S. Appl. No. 11/323,829 dated Jun. 18, 2009.
Office Action for U.S. Appl. No. 11/324,131 dated Apr. 2, 2009.
Office Action for U.S. Appl. No. 11/324,131 dated May 27, 2010.
Office Action for U.S. Appl. No. 11/324,131 dated Oct. 6, 2009.
Office Action for U.S. Appl. No. 11/324,131 dated Oct. 3, 2008.
Office Action for U.S. Appl. No. 11/324,138 dated Feb. 11, 2009.
Office Action for U.S. Appl. No. 11/324,138 dated Aug. 18, 2009.
Office Action for U.S. Appl. No. 11/324,140 dated Aug. 4, 2009.
Office Action for U.S. Appl. No. 11/324,141 dated Aug. 21, 2009.
Office Action for U.S. Appl. No. 11/324,141 dated Feb. 27, 2009.
Office Action for U.S. Appl. No. 11/324,141 dated Mar. 3, 2010.
Office Action for U.S. Appl. No. 11/324,146 dated Mar. 25, 2009.
Office Action for U.S. Appl. No. 11/324,146 dated Jan. 8, 2008.
Office Action for U.S. Appl. No. 11/324,146 dated Nov. 12, 2008.
Office Action for U.S. Appl. No. 11/324,146 dated Nov. 13, 2009.
Office Action for U.S. Appl. No. 11/324,203 dated Sep. 1, 2009.
Office Action for U.S. Appl. No. 12/336,795 dated Dec. 16, 2010.
Office Action for U.S. Appl. No. 12/557,497 dated Nov. 18, 2010.
Office Action for U.S. Appl. No. 12/560,154 dated Feb. 4, 2011.
Office Action for U.S. Appl. No. 12/560,154 dated Sep. 1, 2010.
Office Action for U.S. Appl. No. 12/871,246 dated Feb. 4, 2011.
Official Notification, Israeli App. No. 184308, mailed Feb. 7, 2011.
R. Briscoe, "The Implications of Pervasive Computing on Network Design," BT Technology Journal, pp. 170-190, Jul. 2004.
Ranzau et al., "Softricity/Tacit, An Innovative Approach to Virtual Computing," http://www.daboc.com/downloadnow.aspx?file=211&is=617, Oct. 20, 2005.
Search Report for EP App. No. 10184310.0 dated Dec. 9, 2010.
Search Report for EP App. No. 10184317.5 dated Dec. 7, 2010.
Summons to Oral Proceedings for EP App. No. 05776653.7 dated Jan. 14, 2011.
Supplementary European Search Report for EP04810901 dated Jul. 20, 2011.
Teruhara Serada, "SSL VPN", N+1 Network LAN, vol. 21, No. 3, Mar. 1, 2003, pp. 25-40. (19 pages) (English Abstract).
Wang et al., Shield: Vulnerability-Driven Network Filters for Preventing Known Vulnerability Exploits, Feb. 2004, Microsoft Research, MSR-TR-2003-81.
Written Opinion for PCT/US2005/23914 dated May 7, 2007.
Written Opinion of the International Searching Authority for PCT/US2007/066433 mailed on Oct. 31, 2007.
Advisory Action for U.S. Appl. 11/187,512 dated Mar. 16, 2011.
Biagioni et al., Signature for a network Protocol Stack: A System Application of Standard ML, Jul. 1994.
Chinese Office Action on 200580028535.9 dated Dec. 13, 2011.
Dictionary service [online], [retrieved on Jul. 23, 2009]. Retrieved from the Internet <URL: http://dictionary.reference.com/browse/discard>.
European Communication on 05763688.8 dated Dec. 20, 2011.
European Communication on 05776653.7 dated Jun. 24, 2011.
European Exam Report on 07007414.1 dated Aug. 11, 2011.
European Exam Report on 10184310.0 dated Aug. 11, 2011.
European Examination Report on 05774886.5 dated Nov. 24, 2011.
European Supplemental Search Report on 05763688.8 dated Dec. 1, 2011.
Examination Report on 3929/KOLNP/2006 dated Nov. 30, 2012.
Hasegawa et al., "A Mechanism for TCP Performance Enhancement over Assymetrical Environment," Proceedings 8th IEEE ISCC'03, 1530-1346/03, 2003.
Indian Examination Report on 3959/KOLNP/2006 dated Feb. 5, 2013.
Indian Examination Report on 531/KOLNP/2007 dated Feb. 8, 2013.
Non-Final Office Action for U.S. Appl. No. 11/161,093 mailed Jun. 28, 2011.
Notice of Allowance on 05785297.2 dated Jul. 6, 2012.

(56) References Cited

OTHER PUBLICATIONS

Notice of Allowance on U.S. Appl. No. 11/161,091 dated Sep. 28, 2012.
Notice of Allowance on U.S. Appl. No. 11/161,093 dated Jun. 18, 2012.
Notice of Allowance on U.S. Appl. No. 12/794,446 dated May 7, 2012.
Notice of Allowance on U.S. Appl. No. 12/871,246 dated Sep. 17, 2012.
Office Action for CA App. No. 2545496 dated Feb. 15, 2011.
Office action for European Application No. 05776653.7 dated Oct. 5, 2007. 7 Pages.
Office Action on U.S. Appl. No. 11/161,091 dated Oct. 5, 2011.
Office Action on U.S. Appl. No. 11/161,093 dated Nov. 3, 2011.
Office Action on U.S. Appl. No. 11/187,508 dated Dec. 20, 2011.
Office Action on U.S. Appl. No. 11/188,274 dated Oct. 18, 2011.
Office Action on U.S. Appl. No. 12/787,231 dated Apr. 11, 2013.
Office Action on U.S. Appl. No. 12/794,446 dated Nov. 23, 2011.
Office Action on U.S. Appl. No. 12/871,246 dated May 15, 2012.
Office Action on U.S. Appl. No. 12/871,246 dated Sep. 27, 2011.
Office Action on U.S. Appl. No. 13/739,895 dated Mar. 13, 2013.
Yoshikazu Kobayashi, VPN service introduction, Computer & Network LAN, vol. 21, No. 3, Mar. 1, 2003, pp. 25-40. (19 pages) (English Abstract).

* cited by examiner

SYSTEMS AND METHODS FOR PROVIDING A VPN SOLUTION

RELATED APPLICATIONS

This application is a continuation of and claims priority to U.S. patent application Ser. No. 12/336,795, filed on Dec. 17, 2008, entitled "SYSTEMS AND METHODS FOR PROVIDING A VPN SOLUTION", and issued as U.S. Pat. No. 7,978,716, which is a continuation of and claims priority to U.S. patent application Ser. No. 10/988,004, filed on Nov. 12, 2004, entitled "SYSTEM, APPARATUS AND METHOD FOR ESTABLISHING A SECURED COMMUNICATIONS LINK TO FORM A VIRTUAL PRIVATE NETWORK AT A NETWORK PROTOCOL LAYER OTHER THAN AT WHICH PACKETS ARE FILTERED", and issued as U.S. Pat. No. 7,496,097, which claims priority to U.S. Provisional Patent Application No. 60/518,305 filed on Nov. 11, 2003, entitled "REMOTE NETWORK ACCESS SOLUTION USING AN ENCRYPTED FRAME RELAY," and U.S. Provisional Patent Application No. 60/524,999 filed on Nov. 24, 2003, entitled "THIRD GENERATION VPN SOLUTION," all of which are incorporated herein by reference in their entirety for all purposes.

FIELD OF THE DISCLOSURE

The present disclosure relates generally to secured communication networks. More particularly, the present invention relates to a system, apparatus and a method for establishing a secured communications link between a remote device and a gateway device, whereby at least the remote device (e.g., such as a remote computing device) is configured to capture and redirect packet traffic at that remote device, and to modify the packets for minimizing latency of encrypted packet traffic for real-time applications.

BACKGROUND OF THE DISCLOSURE

Internet Protocol Security ("IPsec") and Secure Sockets Layer. ("SSL") are examples of conventional encryption protocols that are used to establish virtual private networks ("VPNs") over a public communications network, such as the Internet, to ensure that only authorized users can access data in the VPNs. While functional, traditional VPNs implementing these and other conventional encryption protocols have several drawbacks.

A drawback to implementing IPsec, for example, is that most firewalls cannot effectively route IPsec-encrypted packet traffic with minimal effort, especially those performing network address translation ('NAT"). Although NAT traversal techniques exist to pass IPsec-encrypted packets through NAT firewalls, these techniques limit IPsec-encrypted packets to a couple of ports (e.g., port 80 and 443), thereby forming bottlenecks. Another drawback is that VPNs implementing IPsec require that an address assigned to a remote computing device be visible by a private network to which that remote device is connected, giving rise to a vulnerability to certain breaches in security. For example, a worm infecting a client in the private network can use the visible address of the remote device to propagate itself into a private network including that remote device. At least some of the drawbacks of IPsec-based VPNs are due to performing both packet inspection and encryption at the network layer, such as at the Ethernet frame-level.

One drawback to implementing SSL, for example, is that this protocol is typically limited to web applications, thereby precluding the use of numerous other applications that are not browser-based. Another drawback is that SSL-based VPNs do support a wide range of routing protocols. Consequently, SSL-based VPNs cannot generally support real-time applications, such as voice over IP, or "VoIP," and peer-to-peer applications. At least some of the drawbacks of SSL-based VPNs are due to performing both packet inspection and encryption at the transport layer (or the applications layer), which limits routing protocols to, for example, User Data Protocol ("UDP") and Transmission Control Protocol ("TCP").

Thus, there is a need for a system, an apparatus and a method to overcome the drawbacks of the above-mentioned implementations of encryption protocols in VPNs, and in particular, to establish a secured communications link from a remote computing device to a private network by capturing and redirecting packet traffic at the remote device and by modifying the packets to at least minimize the latency of encrypted packet traffic for real-time applications.

A system, apparatus and a method for implementing a secured communications link at a layer other than that at which packets are filtered are disclosed. In one embodiment, a computer system is configured to form a virtual private network ("VPN") and comprises an address inspection driver to identify initial target packet traffic addressed to a target server. Also, the computer system includes a pseudo server module to receive rerouted initial target packet traffic from the address inspection driver. The pseudo server module is configured to convey packet regeneration instructions to a VPN gateway. The address inspection driver functions to identify additional target packet traffic addressed to the target server and routes the additional target packet traffic to the pseudo server. In one embodiment, the pseudo server is configured to strip header information from the additional target packet traffic to form a payload, and thereafter, to route the payload to the target server.

A method is disclosed, according to another embodiment of the present invention, whereby the method secures communications with a remote client computing device by establishing a virtual private network. The method comprises generating packet traffic with a communication application running on a client computing device, identifying at the client computing device target packet traffic of the packet traffic that is addressed to a target server, forming a secure communications link between a pseudo server module on the computing device and the target server, directing additional packet traffic addressed to the target server to the pseudo server module, sending an acknowledgment to the communication application upon receipt of the additional packet traffic rerouted to the pseudo server module, and routing a payload to the target server.

In yet another embodiment, a virtual private network comprises a client machine configured as a pseudo server machine with respect to a communication application running on the client machine. The communication application is configured to receive packet traffic acknowledgements from the pseudo server machine. A virtual private network gateway is included and is operative with a server machine to function as a client machine with respect to the pseudo server machine, thereby facilitating secure communications between the client machine and the server machine.

BRIEF DESCRIPTION OF THE DRAWINGS

A more complete understanding of the present invention is apparent and more readily appreciated by reference to the following Detailed Description and to the appended claims when taken in conjunction with the accompanying Drawings wherein:

DETAILED DESCRIPTION OF EXEMPLARY EMBODIMENTS

Figure 1:
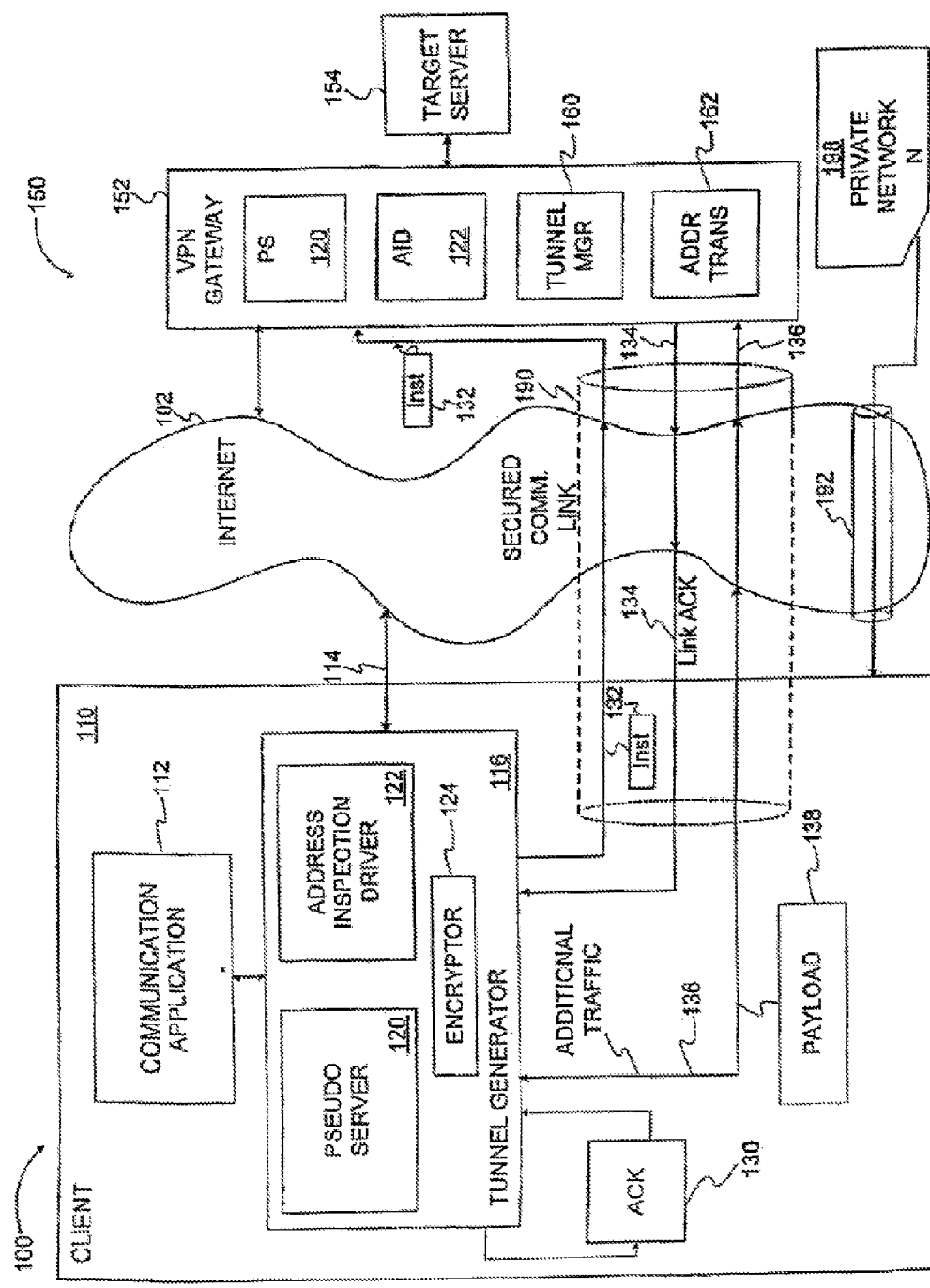
FIG. 1 is a diagram illustrating a virtual private network ("VPN") system for establishing a secured communications link between a remote computing device and a VPN gateway computing device, according to one embodiment of the present invention.

FIG. 1 is a diagram illustrating a virtual private network ("VPN") system for establishing a secured communications link between a remote computing device and a VPN gateway computing device, according to one embodiment of the present invention. A virtual private network 100 includes a remote client computing device ("client") 110 coupled via a secured communications link ("secured comm. link") 190 to private network 150 for exchanging encrypted data. Remote client computing device 110 is configured to capture and reroute packet traffic associated with one or more virtual private networks private networks ("VPNs") at or near the network layer (i.e., Layer 2 of the Open System Interconnection model, or "OSI" model). By capturing and inspecting packets at the network layer, remote client computing device 110 is able to inspect a wide range of network traffic including, for example, Internet Protocol ("IP"), TCP, UDP, Internet Control Message Protocol ("ICMP"), Generic Routing Encapsulation ("GRE) techniques, Apple talk, Netbios, etc. Further, remote client computing device 110 can generate secured communications link 190 (or "tunnel") at or near the transport layer (i.e., Layer 4), thereby permitting encrypted packets to pass through network address translation ("NAT")-based firewalls and network devices. In at least one embodiment, private network 150 assigns an address to remote client computing device 110 that can be concealed from computing devices (e.g., target server 154) in that private network, thereby reducing exposure of remote client computing device 110 to security threats, such as worms. In a specific embodiment, remote client computing device 110 is configured to modify packets by, for example, stripping header information prior to transport via secured communications link 190, thereby minimizing latency of encrypted packet traffic in real-time applications.

Although not shown, remote client computing device 110 includes a processor and a memory for executing and storing programs instructions, respectively, for running various user-level computer software applications (e.g., Microsoft Outlook@). Remote client computing device 110 includes a communication application 112 as an intermediary to exchange data between the computer software applications to private network 150. Examples of communication application 112 are telnet, File Transfer Protocol ("FTP"), Simple Mail Transfer Protocol ("SMTP"), Hypertext Transfer Protocol ("HTTP") and the like.

Also, remote client computing device 110 includes a tunnel generator 116 configured to generate at least one end of secured communications link 190. Tunnel generator 116 includes an address inspection driver ("AID") 122, a pseudo server ("PS") 120 and an encryptor 124, each of which is composed of either hardware or software, or both. Address inspection driver ("AID") 122 is disposed at or near the network layer to capture and inspect packet traffic, such as network (e.g., Ethernet) frames, traversing the one or more network adapters of remote client computing device 110. During inspection of, for example, the IP headers of captured packets, address inspection driver 122 determines whether the captured packets are destined for private network 150. If a packet is not bound for private network 150, then address inspection driver 122 forwards the packet as an unencrypted packet via path 114 out into Internet 102.

But when packet traffic is identified as being destined to private network 150 (i.e., "target packet traffic"), address inspection driver 122 filters that packet traffic from passing out onto path 114. Address inspection driver 122 reconfigures the filtered packets (i.e., the target packet traffic) as "incoming packets" to reroute them to a traffic port on pseudo server 120. In some embodiments, that traffic port can be a "well known port" on remote client computing device 110, where a well known port can be any of port numbers 0 to 1024, or the like. In addition, address inspection driver 122 is configured to also send control information encapsulated as control packets along with the rerouted filtered packets to pseudo server 120. Note that it is not necessary to generate a control packet for every rerouted filtered packet as pseudo server 120 can detect other packets to which the same control information will be applicable. While address inspection driver 122 can be implemented in accordance with the Network Driver Interface Specification ('WDIS"), it can also be implemented in program instructions operable with any known operating system, such as UNIX, Linux, Microsoft Windows™ and the like.

Pseudo server ("PS") 120 is disposed at or near the transport layer to receive encrypted packet traffic from secured communications link 190 and to transmit (i.e., redirect) encrypted packet traffic that is rerouted from address inspection driver 122. In some embodiments, pseudo server 120 is configured to modify packets by, for example, stripping header information prior to transport via secured communications link 190. In operation, pseudo server 120 monitors (or "listens" to) its traffic ports waiting to accept incoming rerouted packets and any control packets that get passed from address inspection driver 122. Pseudo server 120 associates the control packets with respective rerouted packets, and then creates a message frame 132 for transmission to private network 150. Message frame 132 includes, among other things, regeneration instructions for reconstructing the packets at private network 150. Note that message frame 132 is generally then encrypted and sent over secured communications link 190 to private network 150.

Note that when pseudo server 120 receives encrypted packet traffic from secured communications link 190 rather than transmitting it, pseudo server 120 provides for the decryption of those packets by passing them to encryptor 124. Then, pseudo server 120 passes the decrypted packets to address inspection driver 122, along with control information, if any. In response, address inspection driver 122 reconfigures those decrypted packets signals as "incoming packets" to reroute them to communication application 112.

In at least one embodiment, pseudo server 120 is configured to modify outgoing packets to form modified packets. In this example, pseudo server 120 can strip header information from the outgoing packets bound for private network 150. Examples of header information that can be stripped include TCP headers, IP headers, link layer headers, and the like. The residual data of the packets from which the header information is stripped is referred to as "modified packets," each including a payload. A modified packet is depicted in FIG. 1 as "payload" 138. Further, message frame 132 includes regeneration instructions to reconstruct the stripped header information for regenerating the pre-modified packets in private network 150. In some cases, message frame 132 can include authentication information. Once message frame 132 is understood by at least one entity of private network 150, a link acknowledgment ("ACK) 134 is returned to tunnel generator 116. In a specific embodiment of the present invention, pseudo server 120 forms modified packets as pseudo-UDP packets, which constitute additional traffic 136 composed of modified packets 138 to be conveyed to private network 150. As such, tunnel generator 116 generates an acknowledgement 130 when sending modified packet 138 to prevent delays associated with acknowledgements required by TCP standards. Acknowledgement 130 can be implemented as a "false acknowledgement" so that remote client computing device need not wait for an acknowledgment (e.g., a TCP acknowledgement) when sending a modified packet 138. Accordingly, modified packets 138 are TCP packets that can behave as UDP packets. As such, secured communications link 190 can be referred to as a "virtual TCP connection" rather than a standard TCP connection as the packets traversing link 190 are UDP packets masquerading as TCP packets. In one embodiment, tunnel generator 116 determines that traffic target packets includes a certain type of data, such as video or audio data, that is time sensitive (i.e., part of a exiting and real-time application) and selectively modifies those traffic target packets to form modified packets 138.

Encryptor 124 is configured to establish a connection with private network 150 and to encrypt and decrypt packets entering, respectively, remote client computing device 110. For example, encryptor 124 can establish a connection using Hyper Text Transfer Protocol over Secure Socket Layer ("HTTPS"), Proxy HTTPS and like connection protocols. With these connection protocols being operative generally at a transportation layer (or a higher layer), encryptor 124 establishes a connection that is suitable for traversing NAT-based firewalls and bridges. Once a connection (e.g., HTTPS) is established, the payload of the packets bound for private network 150 is encrypted using, for example, Secure Socket Layer ("SSL"), Transport Layer Security ("TLS") Protocol, or the like. Encryptor 124 can encrypt an entire packet including header information, such as an IP header, if not stripped.

Private network 150 includes a VPN Gateway 152 and a target server 154, which represents any computing device (as either a server or a client) with which remote client computing device 110 establishes communications. VPN Gateway 152 is an intermediary computing device that coordinates establishment of secured communications link 190 with remote client computing device 110. VPN Gateway 152 exchanges communications between remote client computing device 110 and target server 154. Further, VPN Gateway 152 is similar, at least in some respects, to remote client computing device 110. Namely, VPN Gateway 152 includes a processor, a memory and an encryptor, all of which are not shown, as well as address inspection driver ("AID") 122 and a pseudo server ("PS")' 120. AID 122 and PS 120 have similar functionality and/or structure as those described in relation to remote client computing device 110.

VPN Gateway 152 also includes a tunnel manager ("Tunnel Mgr") 160 kd an address translator ("Addr Trans") 162. Tunnel manager 160 is configured to download as a software program at least pseudo server 120 and address inspection driver 122. Also, tunnel manager 160 is configured to provide configuration information. The configuration information can include a range of addresses that are associated with private network 150 so that remote client computing device 110 can select which packets to filter out as target packet traffic. Further, tunnel manager 160 is also configured to receive message fkame 132 and to regenerate packets to, for example, include IP header information and/or the assigned address of remote client computing device 110.

Address translator 162 is configured to provide a NAT process, and specifically, a reverse NAT process to hide the assigned address of remote client computing device 110 from target server 154. To illustrate, consider the following example in which a TCP connection is created from remote client computing device 110 to target server 154, which has a destination address of 192.168.1.100. First, a TCP SYN packet is generated for address 192.168.1.100. Tunnel generator 116 passes this SYN packet over secured communications link 190. VPN Gateway 152 examines the packet as it arrives and determines that it is a SYN packet for 192.168.1.100. In turn, VPN Gateway 152 generates a new SYN (i.e., replays or regenerates that packet) destined for 192.168.1.100, with a source address appearing to indicated that the new SYN packet originated from 192.168.1.2, which is the private address for VPN Gateway 152. After target server 154 at address 192.168.1.100 generates a SYN-ACK packet, VPN Gateway 152 then receives this packet. Then, a new SYN-ACK packet is in turn conveyed over secured communications link 190 back to tunnel generator 116, which then generates a SYN-ACK packet. This packet appears to originate from target server 154 at address 192.168.1.100, as viewed by remote client computing device 110. In short, VPN Gateway 152 is able to reverse map reply packets and acknowledgments or any other packet as part of that protocol by using unique source port numbers of VPN Gateway 152. In this manner, remote client computing device 110 is able to connect to any foreign private network and still maintain IP invisibility. Such invisibility can be on an application-by-application basis. In some cases, VPN Gateway 152 can optionally enable address visibility by sending an assigned private address for a successfully established secured communications link to a tunnel generator, which in turn, assigns that private address to the remote client computing device in which it resides. But note that the visibility of the address of remote client computing device is not mandatory, but can be optionally enabled, for example, to facilitate certain applications, such as voice applications or any other peer-to-peer applications.

In a specific embodiment, remote client computing device 110 can establish another secured communications link 192 (which is similar to that of link 190) to another private network ("n") 198 simultaneous to the pendency of secured communications link 190. As such, remote client computing device 110 can simultaneously establish multiple VPN tunnels or secured communications links to different private subnets or networks, especially in cases where destination network addresses overlap partially or completely. Note that while Internet 102 is exemplified as a communications network through which secured communications link 190 can be established in accordance with an embodiment of the present invention, remote client computing device 110 can employ tunnel generator 116 to form tunnels to any type of communications networks, such as a wireless network. It will also be understood that the embodiments of the present invention may be implemented using any routing protocol (e.g., Internet Protocol version 6, "IPv6"), in any packet switching technology (e.g., an Ethernet network), over any communications media (e.g., Ethernet cabling, wireless, optical fibers, etc.) and for use with any computing device (e.g., a wireless station) as an end station, without deviating from the scope and the spirit of the present invention.

Figure 2:
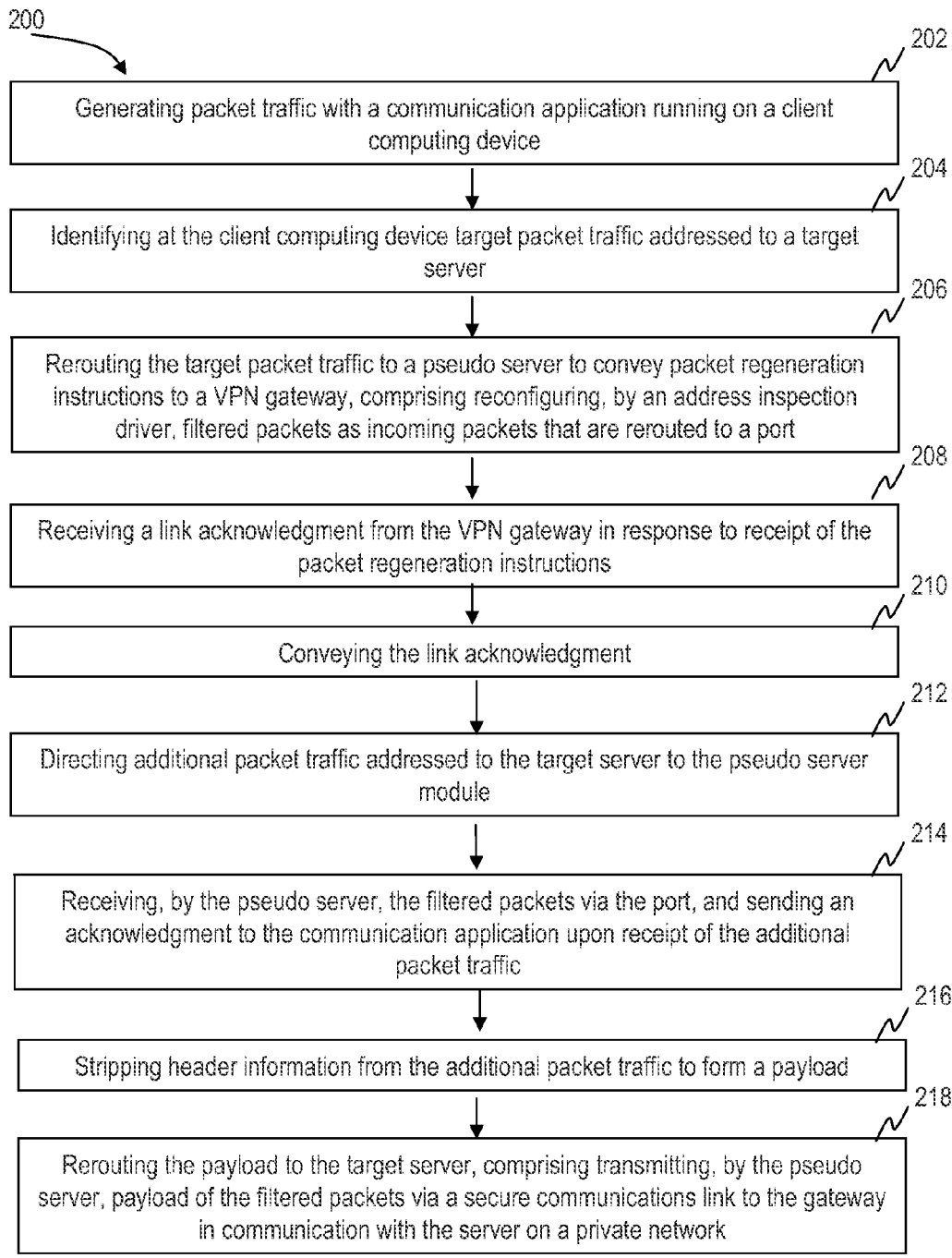
FIG. 2 is a flow diagram depicting an exemplary method of communicating packets over a secured communications link, according to one embodiment of the present invention.

FIG. 2 is a flow diagram 200 depicting an exemplary method of communicating packets over a secured communications link, according to one embodiment of the present invention. At 202, a communications application running on a remote client computing device, such a telnet application, generates packet traffic in response to a request by a user-level application to access a private network. The client computing device at 204 identifies target packet traffic bound for a target server. At 206, the target packet traffic is rerouted to a pseudo server module to at least convey packet regeneration instructions to, for example, a VPN Gateway. The client computing device, receives a link acknowledgement sent from the VPN Gateway at 208, thereby signaling, for example, that a secured communications link between the client and the private network is operational. In turn, the link acknowledgment is conveyed at 210 to the communications application to initiate packet transfer. At 212, additional packet traffic addressed to the target server can be directed to the pseudo server module from, for example, an address inspection driver. Thereafter, at 214, an acknowledgement can be sent to the communications application upon receipt of the additional packet traffic at the pseudo server module prior to transmission to the target server, according to at least one embodiment of the present invention. In some embodiments, header information is stripped form the additional packet traffic to form a payload at 216. Then, the payload at 218 is routed to the VPN Gateway.

Figure 3:
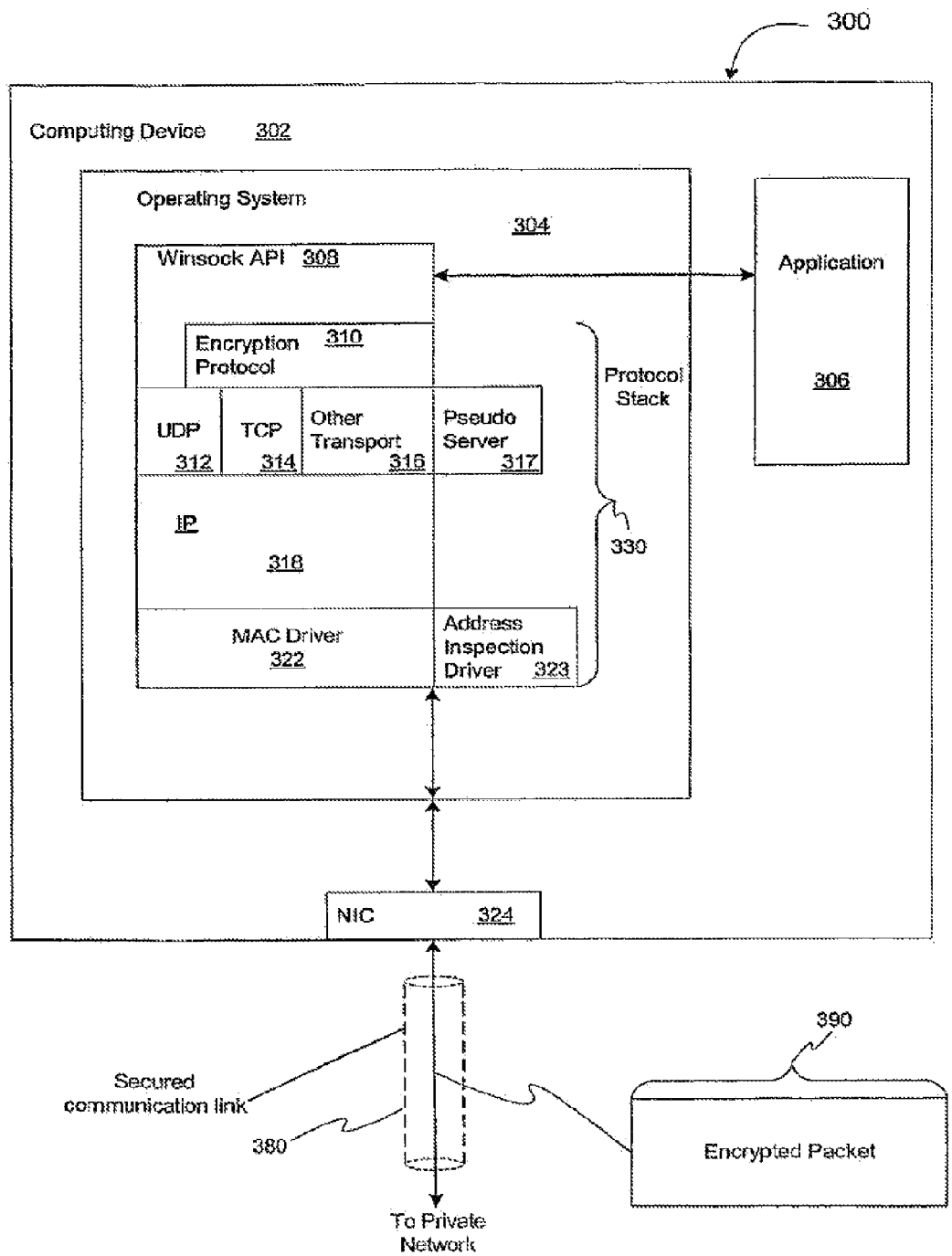
FIG. 3 is a block diagram for describing a remote client computing device in accordance with one embodiment of the present invention.

FIG. 3 is a block diagram for describing a remote client computing device in accordance with one embodiment of the present invention. Computing device 302 in this example is capable of exchanging encrypted packet traffic 390 with another computing device located, for example, on a private network via a secured communications link 380. In the example shown in FIG. 3, computing device 302 includes an operating system 304 coupled to a network interface card ("NIC") 324, which can be, for example, an Ethernet network adapter. Operating system 304 also includes a protocol stack 310, which can be any set of network protocols for binding high-level protocol layers, such as an application layer, to lower-level protocol layers, such as a physical layer including NIC 324. As shown, protocol stack includes a pseudo server 317, an address inspection driver 323 and an encryption protocol 310 in accordance with a specific embodiment of the present invention.

Protocol stack 310 is shown to include at least a transport layer, a network layer and a link layer. The transport layer includes at least one transport protocol, such as a UDP process 312, a TCP process 314 (i.e., a TCP service) or an optional another type of transport protocol, "other transport" protocol 316, such as "ICMP." FIG. 3 shows that the network layer, which includes an IP process 318 (i.e., an IPv4 or IPv6 service), can be at a next higher layer over the link layer. In this example, pseudo server 317 is disposed at the transport layer and address inspection driver 323 is disposed near the network layer. In particular, address inspection driver 323 is disposed at the data link layer. An encryption protocol 310, such as SSL, can be disposed along side or above pseudo server 317, and is suitable to implement encryptor 124 of FIG. 1. In FIG. 3, encryption protocol 310 is in a layer above TCP process 314.

According to one embodiment of the present invention, protocol stack 310 is a collection of processes embodied in software. In another embodiment, protocol stack 310 and/or its constituents can be embodied in software or hardware, or both. Each process (e.g., TCP 314, IP 318, etc.) of protocol stack 310 is configured to communicate with each other process, such as across layers of protocol stack 310. A higher-level layer, such as the transport layer, can be configured to communicate, for example, via a Winsock API 308 (or any other socket layer program to establish, for example, raw sockets) with an application 306. Winsock API 308 provides an interface with application 306, which can be a telnet application. A lower-level layer, such as either a network layer or a link layer, can be configured to communicate, for example, via a MAC driver 322 with NIC 324. Exemplary interactions between pseudo server 317 and address inspection driver 323 to establish a secured communications link are described next in FIGS. 4 and 5.

Figure 4:
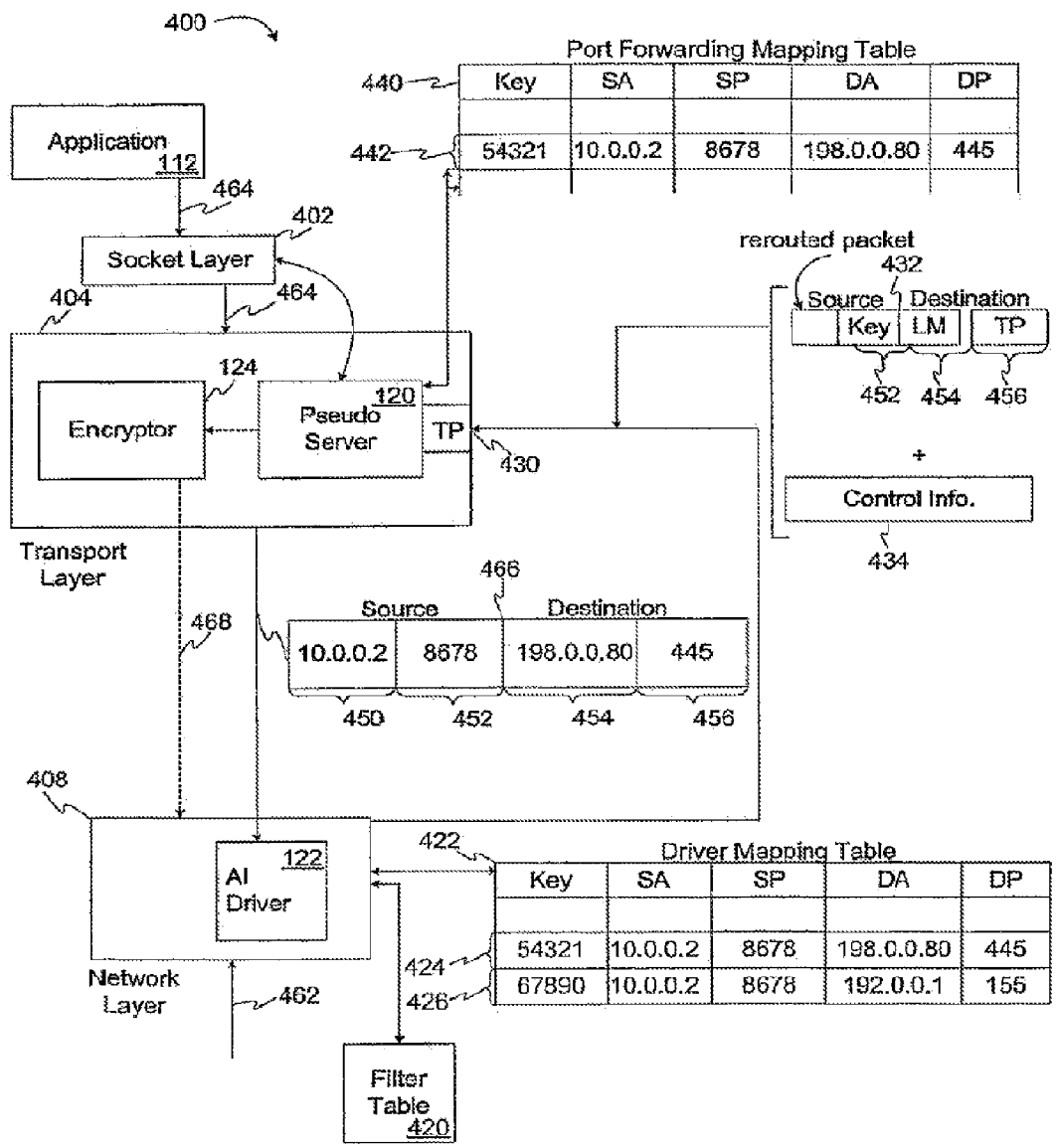
FIG. 4 is a functional block diagram illustrating the interaction between a pseudo server and an address inspection driver when transmitting target packet traffic from a remote client to a private network, according to a specific embodiment of the present invention.

FIG. 4 is a functional block diagram 400 illustrating the interaction between a pseudo server and an address inspection driver when transmitting target packet traffic from a remote client to a private network, according to a specific embodiment of the present invention. In this example, encryptor 124 and pseudo server 120 are disposed at transport layer 404 and address inspection driver ("A1 Dm") 122 is disposed at network layer 408. Again, note that in some embodiments address inspection driver resides at the data link layer. Pseudo server 120 is coupled to a port forwarding mapping data structure 440 that maintains packet information, such as a "key," a source address ("SA"), a source port ("SP"), a destination address ("DA"), and a destination port ("DP"). Similarly, address inspection driver 122 maintains a similar data structure depicted as a driver mapping table data structure 422. Further, address inspection driver 122 is also coupled to a filter table 420 that includes configuration information provided by a VPN Gateway. Filter table 420 includes network addresses, such as a source address and a destination address (e.g., 198.0.0.80), an optional subnet mask (not shown), a protocol, such as TCP, UDP, ICMP, etc. (not shown), port information, such as a source port and a destination port, and a unique mapping key to uniquely identify destination information associated with target packet traffic. Pseudo server 120 and address inspection driver 122 synchronize these data structures by exchanging control information, such as in a control packet 434, when a change is made to one of those data structures. An exemplary control packet 434 can be a UDP packet or a packet of any other protocol, and is typically sent with rerouted data packets to pseudo server 120. If some of the control information includes updates to entry 442, such as a change in destination port, than that change is entered. In some cases, the control information includes how the packet should be handled or regenerated at the VPN Gateway.

Consider that application 112 resides on a remote client computing device and is identifiable by a source address of 10.0.02 and a source port of 8678, and a target server (not shown) resides at destination address 198.0.0.80 and destination port 445. If address inspection driver 122 has yet to detect the destination address or port in packet traffic 462, then a destination address and a destination port for that target server is stored in driver mapping table data structure 422. In this case, an entry 424 is made in data structure 422 to include a source address ("SA") as 10.0.0.2, a source port ("SP") as 8678, a destination address ("DA") as 198.0.0.80, and a destination port ("DP") as 445, as well as a "key" that is generated and assigned to the packet traffic by address inspection driver 122. Note that entry 426 signifies that application 112 has formed another secured communications link to another VPN Gateway and that address inspection driver 112 is configured to inspect packet traffic relating to both entries 424 and 426. As such, multiple VPNs can be established concurrently with application 112.

Next, consider that application 112 is generating target packet traffic 464 that is destined for destination address 198.0.0.80 and destination port 445. This target packet traffic 464 passes through a socket layer 402 to pseudo server 120. Socket layer 402 can include a Winsock API, a Winsock provider or any other socket connection provider process (e.g., a programming interface that provides for raw sockets), regardless of operating system. Pseudo server 120 matches entries of data structure 440 to information in target packet traffic 464 to determine whether that packet traffic is part of a VPN. Since an entry in data structure 440 includes a DA and a DP that respectively correspond to 198.0.0.80 and 445, a match is made and pseudo server 120 concludes that packet traffic 464 is to be routed via a secured communications link. Pseudo server 120 then passes target packet traffic 466 to address inspection driver 122, whereby target packet traffic 466 is characterized by source address ("SA") 450, source port ("SP") 452, destination address ("DA") 454 and destination port ("DP") 456. Note that FIG. 4 shows packet 466 and other packets with select address and port information; other packet data, including payload, is omitted for discussion purposes.

Address inspection driver 122 then reconfigures target packet traffic 466 and reroutes it back to pseudo server 120 as rerouted packet 432. In at least one embodiment, address inspection driver 122 reconfigures SP 452 to include a "key," which in this example, is "54321." Also, DA and DP are respectively reconfigured to include a local host or a local machine ("LM") address 454 and a traffic port ("TP") 456. In a specific embodiment, local machine address 454 is 127.0.0.1, which is a loop back address causing rerouted packet 432 to be sent up the OSI protocol stack. Address inspection driver 122 sends rerouted packet 432 up to traffic port ("TP") 430 of pseudo server 120, where TP 430 is a listening port for detecting, for example, TCP packets. In some embodiments, rerouted packet 432 is sent to a TCP traffic port of pseudo server 120 regardless of whether rerouted packet 432 is a UDP packet, such as in the case where pseudo server 120 generates a pseudo-UDP packet as a modified packet. Concurrently (or nearly so), control packet 434 includes a local machine address (not shown) so that it can be sent up the OSI protocol stack to a control port (not shown) of pseudo server 120. In such a case, control packet 434 includes information describing the modifications to a packet to form rerouted packet 432. Thereafter, pseudo server 120 then redirects rerouted packet 432 to encryptor 124 to form an encrypted packet 468 that is passed through a secured communications link.

Figure 5:
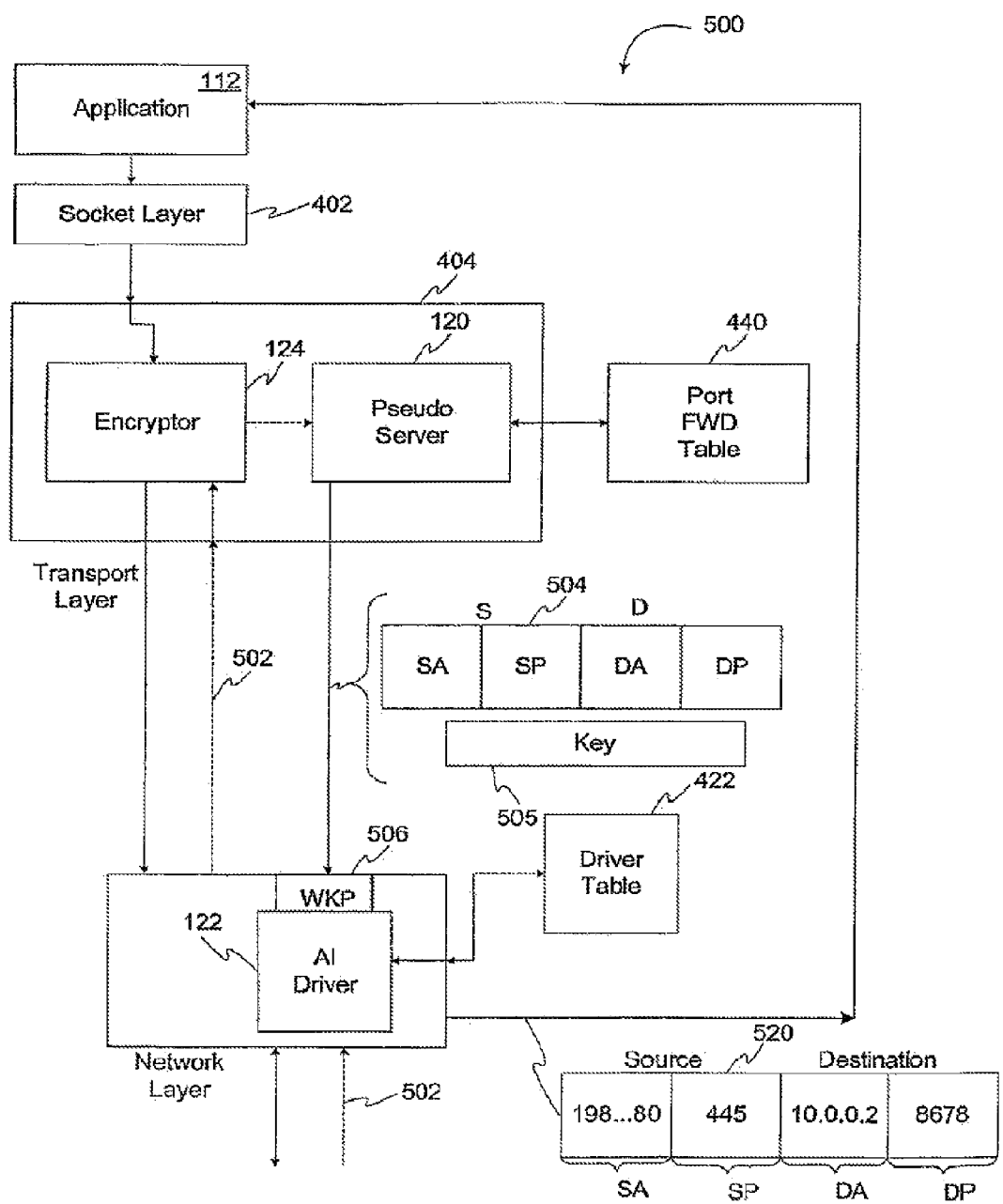
FIG. 5 is a functional block diagram illustrating the interaction between a pseudo server and an address inspection driver after receipt of encrypted packet traffic into a remote client from a private network, according to a specific embodiment of the present invention.

FIG. 5 is a functional block diagram 500 illustrating the interaction between a pseudo server and an address inspection driver after the receipt of encrypted packet traffic into a remote client from a private network, according to a specific embodiment of the present invention. To illustrate the interaction, consider that an encrypted packet 502 is passed through to encryptor 124 for decryption. Then, the decrypted packet is passed to pseudo server 120, which matches at least some of the contents of the decrypted packet against data in data structure ("port fwd table") 440. Consider that a match is made, thereby signifying that the decrypted packet is part of an established VPN. As such, pseudo server 120 provides decrypted packet 504 and an attendant control packet 505, which in this case includes the key associated with packet 504, to a well known port ("WKP") 506 of address inspection driver 122. Thereafter, address inspection driver 122 reconfigures decrypted packet 504 in accordance with information indexed by the key into driver table 422, which is similar to the data structure of FIG. 4. As such, the reconfigured packet will include destination information that identifies application 112. As such, rerouted packet 432 is signaled as an "incoming" (or received) packet 520 and is passed up the protocol stack to application 112.

Figure 6:
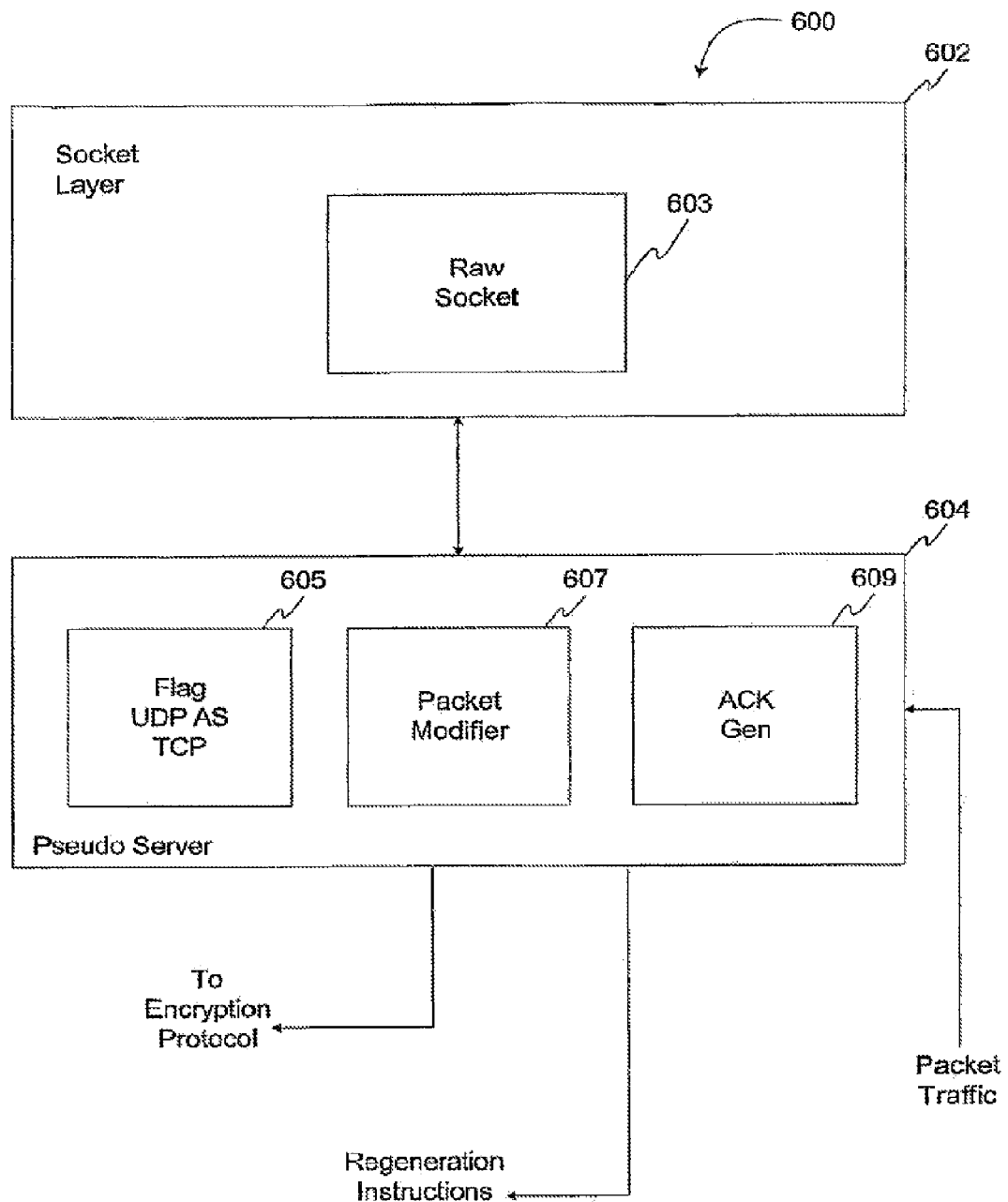
FIG. 6 is a block diagram illustrating various modules of a pseudo server for communicating encrypted packets for real-time and other applications, according to various embodiments of the present invention.

FIG. 6 is a block diagram 600 illustrating various modules of a pseudo server to modify packets for real-time applications, according to at least one embodiment of the present invention. As shown, pseudo server 604 includes a flag-UDP-as-TCP module 605, a packet modifier module 607, and an acknowledgement generator ("ack gen") 609, one or more of which can be simultaneously operative when sending packets through a secure communications link of the present invention. Although real-time packet traffic, such as voice and video, benefits from the performance advantages of a sessionless protocol, such as UDP, standard UDP packets are generally difficult to traverse through many firewalls, whereas TCP traffic is not so disadvantaged. In at least one specific embodiment of the present invention, pseudo server 604 is configured to form "pseudo-UDP" packets using modified TCP packets.

Flag-UDP-as-TCP module 605 is configured to flag a UDP packet as a TCP packet in the IP header, which fools the communications network into thinking that the packets are part of a TCP session. Packet modifier 607 is configured to operate with raw socket connection process 603 of socket layer 602. In particular, packet modifier 607 strips header information, such as IP header information, and sends the remaining payload via raw socket connections formed by raw socket connection process 603. As such, regeneration instructions are also sent to describe how to reconstruct packets after those packets pass through a secured communications link with header information stripped out. In one embodiment, the regeneration instructions include information for regenerating header information at the target server so that the target packet traffic can be converted from a first format to a second format. In cases where the first format is associated with Transmission Control Protocol ("TCP") and the a second format is associated with User Data Protocol ("UDP"), then the first packet is formatted as a pseudo-UDP (e.g., a UDP packet flagged as a TCP packet), and the second packet is formatted as UDP packet for transmission of, for example, real-time applications.

Acknowledgement generator ("ack gen") 609 is configured to issue "false acknowledgments" in response to TCP representations of UDP packets (i.e., pseudo-UDP packets) being transmitted over the secure communications link. This allows for UDP-like behavior to TCP traffic, in that if the TCP packet (i.e., the pseudo-UDP packet) was lost, no attempt is made by either the transmitting end or the receiving end of the VPN tunnel to synchronize sequence numbers and retransmit that packet. Consequently, the VPN interprets the forwarding of pseudo-UDP packets as the forwarding TCP packets, but with raw sockets on either end of the secured communications link interpreting whether these packets are UDP packets carrying voice (such as RTP) or video.

Various structures and methods for establishing a secured communications link, such as with a pseudo server and an address inspection driver, are described herein. The methods can be governed by or include software processes, for example, as part of a software program. In one embodiment, a pseudo server module and an address inspection driver module are disposed in a software program embedded in a computer readable medium that contains instructions for execution on a computer to implement a secured communications link, according to the present invention.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that nomenclature selected herein is presented to teach certain aspects of the present invention and is not intended to restrict the implementations of the various embodiments. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed:

1. A method for securing a private network communications to a server, the method comprising:
    (a) filtering, by an address inspection driver of a device, packets from outgoing network traffic generated by an application of the device, the filtered packets identified as destined for a server on a private network;
    (b) reconfiguring, by the address inspection driver, the filtered packets as incoming packets that are rerouted to a port;
    (c) receiving, by a pseudo server of the device, the filtered packets via the port; and
    (d) transmitting, by the pseudo server, a payload of the filtered packets via a secure communications link to a gateway in communication with the server on a private network.

2. The method of claim 1, wherein step (a) further comprises intercepting, by the address inspection driver, network traffic of the application.

3. The method of claim 1, wherein step (a) further comprises filtering, by the address inspection driver, network traffic at a network layer of a network stack of the device.

4. The method of claim 1, wherein step (a) further comprises filtering, by the address inspection driver, network traffic at a data link layer of a network stack of the device.

5. The method of claim 1, wherein step (b) further comprises reconfiguring, by the address inspection driver, the filtered packets to identify a destination address of a local host.

6. The method of claim 1, wherein step (b) further comprises reconfiguring, by the address inspection driver, the filtered packets to identify a loop back address of a network stack of the device.

7. The method of claim 1, wherein step (c) further comprises listening, by the pseudo server, on the port for filtered packets.

8. The method of claim 1, wherein step (d) further comprises stripping, by the pseudo server, header information from the filtered packets.

9. The method of claim 1, wherein step (e) further comprises transmitting, by the pseudo server to the gateway, instructions on regenerating the stripped header information on the private network.

10. The method of claim 1, wherein step (e) further comprises encrypting, by the pseudo server, the payload of the filtered packets.

11. A method for communicating packets from real time applications via a secure communications link, the method comprising:
    (a) intercepting, by an address inspection driver of a device, packets from outgoing real-time packet traffic generated by a real-time application of the device, the packets comprising user datagram protocol (UDP) packets identified as destined for a server on a private network;
    (b) communicating, by the address inspection driver, the packets to a pseudo server executing on the device and having a secure communications link to a gateway in communication with the server on the private network
    (c) modifying, by a pseudo server, the packets to comprise UDP packets flagged as transport control protocol (TCP) packets; and
    (d) transmitting, by the pseudo server, the modified packets via the secure communications link to the gateway.

12. The method of claim 11, wherein step (a) further comprises intercepting, by the address inspection driver, packets from outgoing real-time packet traffic comprising one of video or audio data.

13. The method of claim 11, wherein step (a) further comprises filtering, by the address inspection driver, network traffic at a network layer of a network stack of the device.

14. The method of claim 11, wherein step (a) further comprises filtering, by the address inspection driver, network traffic at a data link layer of a network stack of the device.

15. The method of claim 11, wherein step (b) further comprises reconfiguring, by the address inspection driver, the packets to identify a destination address of a local host.

16. The method of claim 11, wherein step (b) further comprises reconfiguring, by the address inspection driver, the packets to identify a loop back address of a network stack of the device.

17. The method of claim 11, wherein step (b) further comprises listening, by the pseudo server, on a port for packets communicated by the address inspection driver.

18. The method of claim 11, wherein step (c) further comprises flagging, by the pseudo server, UDP packets as TCP packets by setting a flag in an Internet Protocol header of the UDP packets.

19. The method of claim 11, wherein step (c) further comprises modifying, by the pseudo server, an Internet Protocol header of the UDP packets to masquerade the UDP packets as TCP packets.

20. The method of claim 11, wherein step (d) further comprises transmitting, by the pseudo server, the modified packets via a raw socket connection.

\* \* \* \* \*